(12) United States Patent
DiSimone

(10) Patent No.: US 7,452,494 B2
(45) Date of Patent: Nov. 18, 2008

(54) METHOD FOR LOADING A MOLDSET INTO A MOLDING MACHINE

(75) Inventor: John DiSimone, Woodbridge (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 707 days.

(21) Appl. No.: 10/966,711

(22) Filed: Oct. 15, 2004

(65) Prior Publication Data

US 2006/0082028 A1    Apr. 20, 2006

(51) Int. Cl.
*B29C 45/36*    (2006.01)
(52) U.S. Cl. .................. 264/297.2; 29/465; 29/466; 264/328.1
(58) Field of Classification Search ............. 264/328.1, 264/297.2; 29/465, 466; 425/192 R, 185, 425/195
See application file for complete search history.

(56) References Cited

U.S. PATENT DOCUMENTS

| | | | |
|---|---|---|---|
| 3,023,458 A * | 3/1962 | Seymour | 264/161 |
| 3,093,865 A * | 6/1963 | Peters et al. | 425/547 |
| 4,473,346 A | 9/1984 | Hehl | |
| 4,500,274 A | 2/1985 | Cyriax et al. | |
| 4,500,275 A | 2/1985 | Ruhl | |
| 4,568,263 A | 2/1986 | Ruhl | |
| 4,702,685 A * | 10/1987 | Fruntzek | 425/182 |
| 5,096,404 A | 3/1992 | Janos et al. | |
| 5,096,405 A | 3/1992 | Pace et al. | |
| 5,185,119 A | 2/1993 | Schad et al. | |
| 5,518,387 A | 5/1996 | DiSimone | |
| 5,562,935 A | 10/1996 | Martin | |
| 5,707,666 A | 1/1998 | DiSimone et al. | |
| 5,738,883 A * | 4/1998 | Tanaka | 425/190 |
| 5,908,597 A | 6/1999 | Boudreau et al. | |
| 6,027,681 A | 2/2000 | Teng et al. | |
| 6,036,472 A | 3/2000 | Boudreau et al. | |
| 6,099,784 A | 8/2000 | Teng et al. | |
| 6,155,811 A | 12/2000 | Looije et al. | |

FOREIGN PATENT DOCUMENTS

WO    2004/082920    *    9/2004

OTHER PUBLICATIONS

International Search Report for the PCT case related to the above-identified application (PCT/CA2005/001296); ISR dated Nov. 25, 2005.
P. Glorio, Incoe Corp., "Quick Mold Change for Injection Molding Machines", Antec '88, pp. 255-258.
Carl Kirkland, "Quick Mold-Change System Uses No Backplates", Plastics World, Sep. 1991, p. 14.

* cited by examiner

*Primary Examiner*—Jill L Heitbrink

(57) ABSTRACT

A method of loading a moldset having a core plate and a cavity plate into an injection molding machine. The method comprises the steps of latching a cavity plate to a core plate using a removable latch, guiding the core plate into an open mold along a face in the mold while maintaining separation between the face and the core plate and maintaining the cavity plate spaced from hot runner nozzles in a hot runner in the mold, closing the mold to engage the cavity plate with the hot runner nozzles, securing the cavity plate to the hot runner, removing the latch between the cavity plate and the core plate, and opening the mold. The face may be a face of a movable platen or a back surface of a hot runner.

8 Claims, 25 Drawing Sheets

METHOD FOR LOADING A MOLDSET INTO A MOLDING MACHINE

BACKGROUND OF THE INVENTION

1. Field of the Invention

The present invention relates, generally, to an injection molding machine, and more particularly, but not exclusively, the invention relates to three level stack mold injection molding machine.

2. Background Information

The state of the art includes U.S. Pat. No. 5,707,666 that provides a four level mold having linkage for moving the molds that is capable of moving the molds simultaneously and in unison so that the molds open and close together. The linkage would not permit the use of a side entry robot nor does it show open and easy access through the top of the machine.

U.S. Pat. No. 5,518,387 describes a swing arm device for removing parts from a mold. The motion of the swing arm device is synchronized with the opening and closing of the mold to speed up part retrieval.

U.S. Pat. No. 5,185,119 shows a stack mold in Tandem configuration with cores aligned the same way. In this machine the mold is operated on alternate cycles so each side opens sequentially rather than simultaneously.

U.S. Pat. Nos. 6,027,681 and 6,099,784 describe a stack mold that has unequal strokes so that different parts can be molded in the adjacent molds.

U.S. Pat. No. 6,155,811 describes a two level mold that is mounted on linear bearings. This is the type of machine that has been modified by the present invention to provide a three level stack mold in the space occupied by the two level stack mold described in this patent.

U.S. Pat. Nos. 5,908,597 and 6,036,472 describe multiple stack mold machines that use rack and pinion devices to open and close the mold and includes part ejection means that is operated independently of the rack and pinion devices.

An article on page 14 of the September, 1991 issue of Plastics World describes a mold change system that includes self-locating/leveling mold guide slots.

An article by P. Glorio of Incoe Corp. published in ANTEC '88, pages 255 to 258 describes the development of quick mold change systems including systems that use hydraulically actuated wedge-lock clamps.

U.S. Pat. No. 4,473,346 describes a single level molding system where the molding dies are insertable and removable in either the horizontal or vertical direction.

U.S. Pat. No. 4,500,274 describes a quick-change mold system that includes adapter plates provided with service fittings that interconnect and disconnect upon insertion and removal of the molds together with the adapter plates.

U.S. Pat. No. 4,500,275 describes a quick-change mold system that includes a locator clamp for facilitating the insertion and removal of a mold from a molding machine U.S. Pat. No. 4,568,263 describes the use of locator wedge clamp assemblies mounted on and extending from the platens U.S. Pat. No. 5,096,404 describes the use of rollers and guide rails for aligning a mold press in a vertical plane above the injection molding machine.

U.S. Pat. No. 5,096,405 describes a mounting plate attachable to a molding machine platen. The mounting plate has a plurality of retention slots with hydraulically actuated clamps in the slots. Actuation of the clamps presses a mold part toward the platen in an adjusted position.

With the cost of injection molding machines and the competitive pricing of products made thereon, it is essential that the machine be as productive as possible. In the case where the machine must be capable of making a number of different parts, this requires that mold changes be quick and inexpensive. It is also cost effective to minimize the space requirements of the machine. In addition, it is essential that parts be removed from the molds as quickly as possible so the cycle time of the machine can be as short as possible. It is also advantageous to provide a machine that requires only a single set of hot runner plates for all moldsets usable on the machine.

The present invention provides an injection molding machine that enables mold changes to be made quickly and easily, provides robot accessibility to the parts that may be of a variety of heights without modifying the space requirements of the mold and allows a three level stack mold for high profile parts to be placed in space that was previously fully occupied by a two level stack mold.

The invention is achieved by creating a three level stack mold that provides open access to the molds from all sides when the molds are open. Side access is provided by designing a linkage for the stack mold that surrounds the mold opening but does not cross it when the molds are open. Moving all physical connections such as water and electrical lines to the side edges of the mold provides access through the top and bottom. To avoid any electrical faults caused by water leaks from occurring, the electrical connections are made at the top of the mold and the water connections at the lower point of the mold. Air connections are also provided at the top of the machine to avoid or minimize contamination of the air lines by a failure in the water supply system.

When the molds need to be changed, the mold is closed and each cavity plate is latched to its respective core plate. The mold is then opened and each moldset of a cavity plate and a core plate is removed from the machine as a single unit along guides. When the cavity and core plate moldset is fully removed, a new moldset of a cavity plate and a core plate is inserted into the mold and guided by the same grooves. The grooves guide the core plate so that it is slightly separated from the platen until it is very near its home position. When it reaches this position a wedge surface forces the core plate against the platen and automatically locks it into position on the platen. At the same time the air and water connections automatically connect to the core plate by automatic docking mechanisms. When the core plate is in position, the mold is closed and the cavity plate is disconnected from the core plate and firmly attached to the hot runner plate.

The invention also provides a machine in which all three moldsets in the three level stack mold are oriented in the same direction. This enables uniform robot actuation for all three moldsets without the need to reorientate molded parts. This further simplifies the retrieval of molded parts.

With this configuration, the robot can be located in the same position for all parts and enter between the cavity and core faces without interference with either face. The linkage assembly surrounds the mold opening when the mold is open and eliminates the need for robot adjustment when the molds are changed. This also provides weight distribution and manufacturing benefits.

SUMMARY OF THE INVENTION

The present invention provides a method of loading a moldset having a core plate and a cavity plate into an injection molding machine. The method preferably comprises the steps of latching a cavity plate to a core plate using a removable latch, guiding the core plate into an open mold along a face in the mold while maintaining separation between the face and the core plate and maintaining the cavity plate spaced from hot runner nozzles in a hot runner in the mold, closing the mold to engage the cavity plate with the hot runner nozzles, securing the cavity plate to the hot runner, removing the latch between the cavity plate and the core plate; and opening the mold. The method may further include step of bolting the cavity plate to the hot runner. The face may be a face of a movable platen or a back surface of a hot runner.

BRIEF DESCRIPTION OF THE DRAWINGS

Exemplary embodiments of the present invention will now be described with reference to the accompanying drawings, in which.

DETAILED DESCRIPTION

Figure 1:
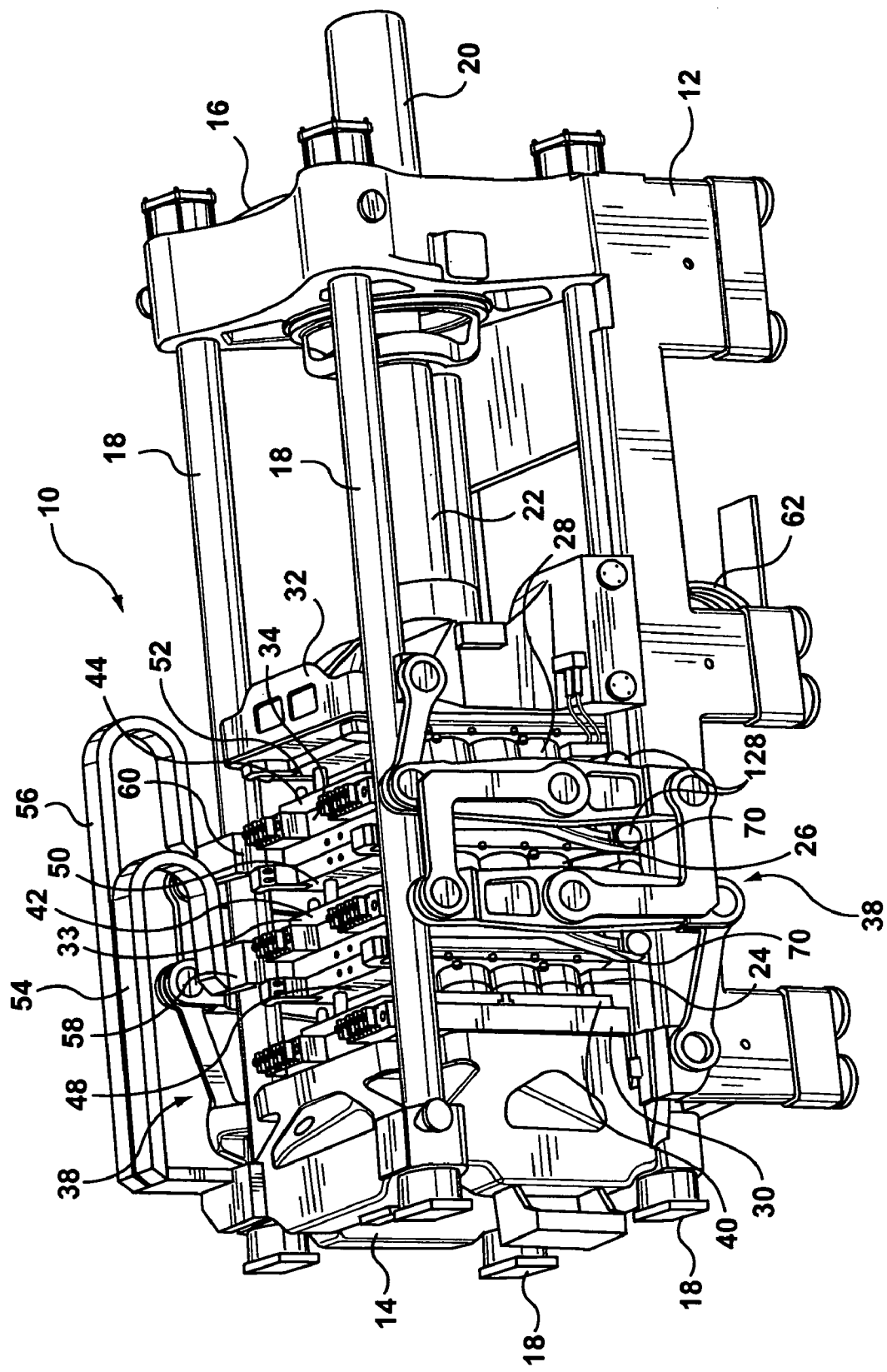
FIG. 1 is a rear perspective view of the injection-molding machine with the mold closed.
Figure 2:
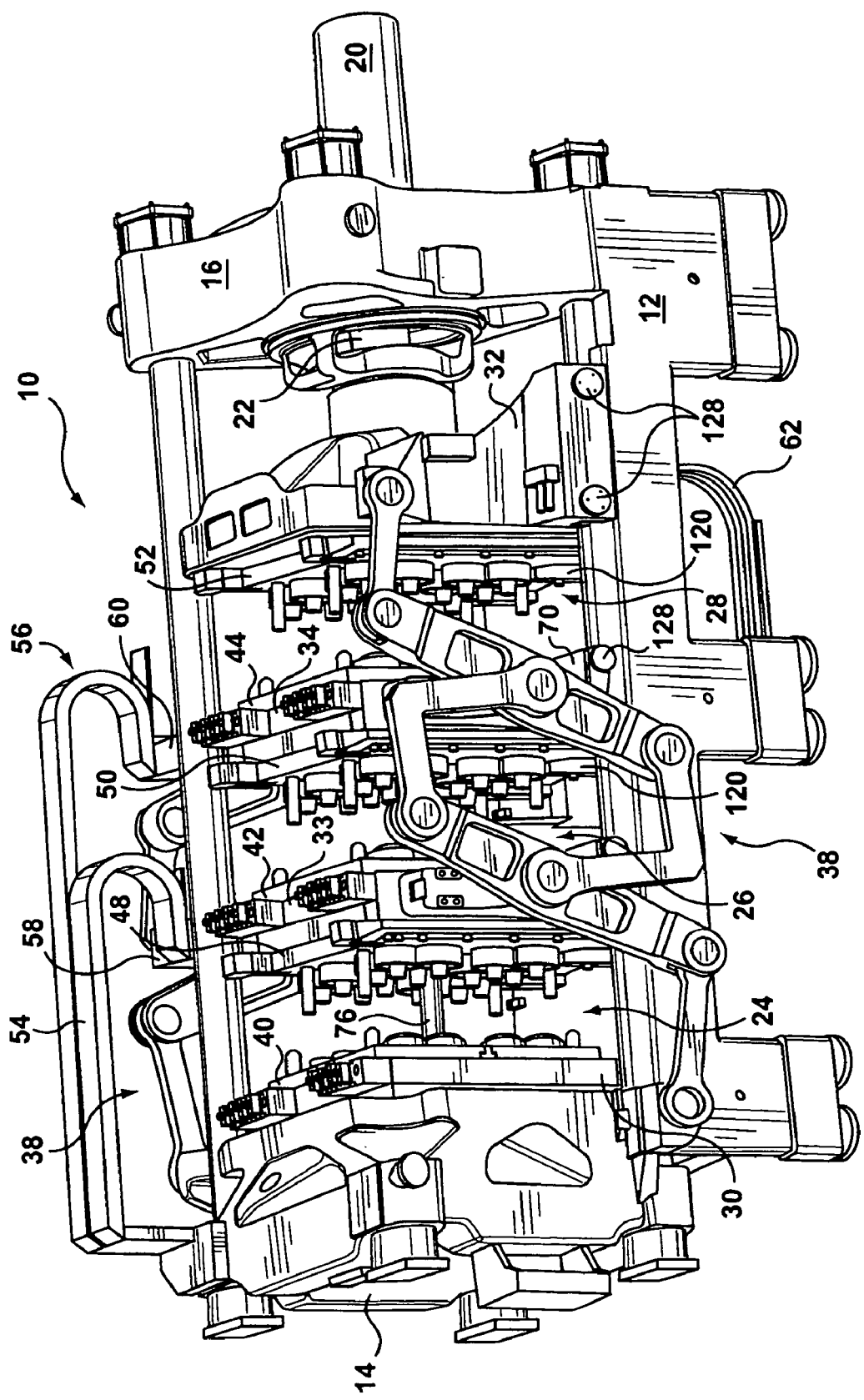
FIG. 2 is a rear perspective view of the injection-molding machine with the mold open.

As shown in FIGS. 1 and 2, the injection-molding machine 10 includes a machine frame 12 and a stationary platen 14 supporting a fixed hot runner 30. Column housing 20 is connected to the molding machine 10 at clamp block 16. Clamp column 22 clamps the moldsets 24, 26 and 28 closed during an injection cycle of the molding machine 10. Moldsets 26 and 28 with their associated hot runners 33 and 34 are mounted on carriers 70. Movable platen 32 and carriers 70 have rollers 128 that travel on frame 12. A stroke cylinder is fixed inside the column housing 20 and drives the clamp column 22 to stroke the movable platen 32. Stroking of the platen 32 drives the linkage assembly 38 to open and close the moldsets 24, 26 and 28. The four tiebars 18 are tensioned by the operation of the clamp piston inside clamp block 16.

Mold cavity plates 40, 42 and 44 are mounted on fixed hot runner 30 and movable hot runners 33 and 34, respectively. Mold core plate 52 is mounted on movable platen 32 and core plates 48 and 50 are mounted on movable hot runners 33 and 34. With this configuration, all the mold cores face in the same direction. This enables any take out robots to be orientated in a single direction so the ejection and removal of molded parts is simplified. This also allows each of the two central moving sections of the three level stack mold machine to be identical to one another. This provides manufacturing benefits as only a single design is required. Furthermore, as each section is identical, a more balanced weight distribution is maintained within the machine.

Water service lines 62 to the machine 10 are arranged inside of the legs of the machine 10. The electrical lines 54 and 56 are shown connected to movable hot runners 33 and 34 over flexible cables joined to brackets 58 and 60. Flexible water lines 62 are similarly connected to the underside of water manifolds 120. The service connections will be fully described hereinafter.

Figure 3:
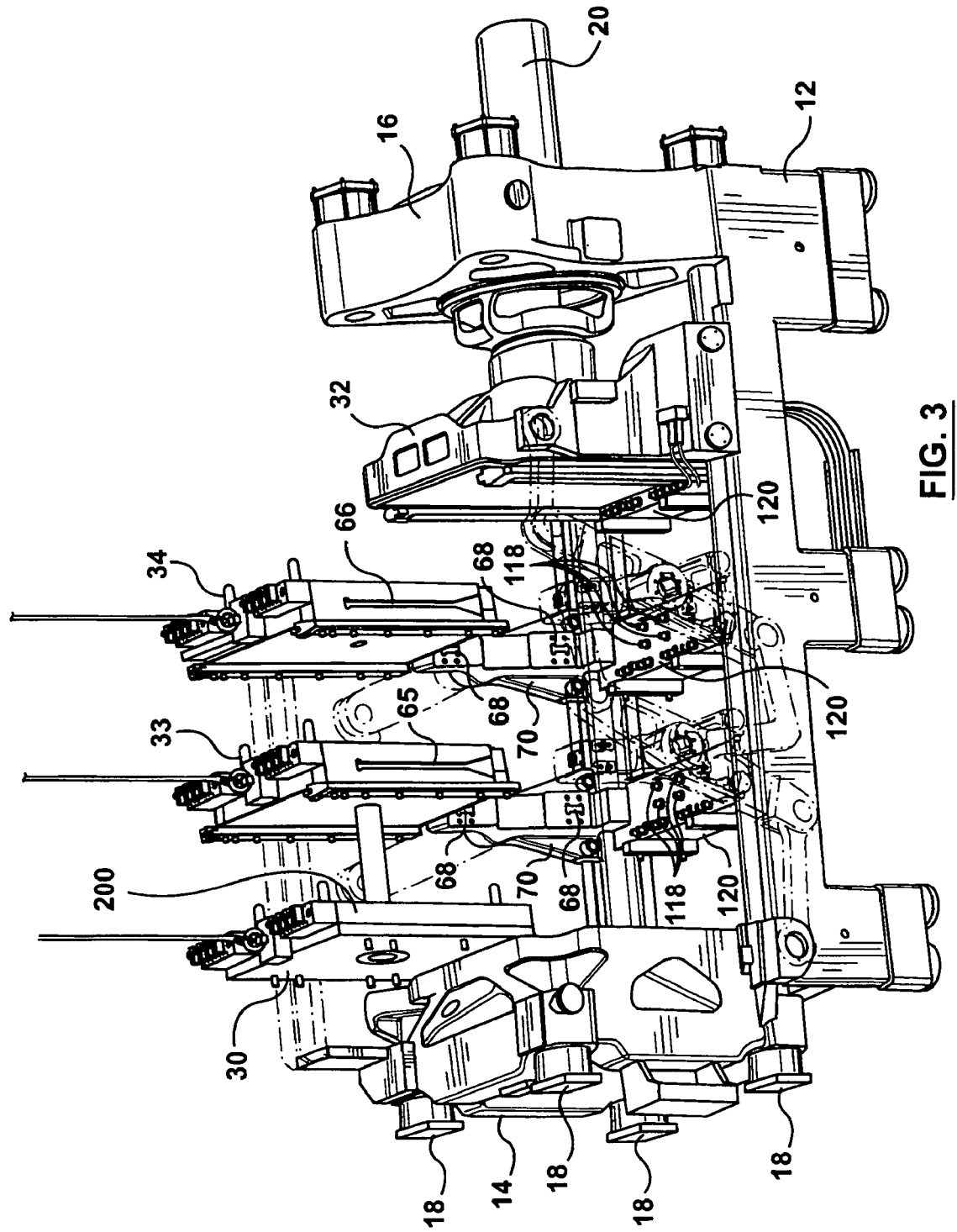
FIG. 3 is a rear perspective view of the injection-molding machine having the three hot runners ready to be loaded into the machine.

FIG. 3 shows the unassembled machine with the fixed hot runner 30 and the movable hot runners 33 and 34 poised above the machine ready to be loaded onto the machine. Of course, in actual operation, only one of the hot runners at a time would be in position to be loaded onto the machine.

Fixed hot runner 30 is lowered onto the machine and bolted by bolts 64 to stationary platen 14. The fixed hot runner 30 is supplied with water connection hoses from the machine to cool hot runner manifold plate 200 and also provide a water circuit to the cavity plate 40. However, movable hot runners 33 and 34 need to be guided onto the machine frame. Key slots. 65 and 66 engage keys 68 on carriers 70. The water connections or nipples 118 protruding from the service manifolds 120 engage female fittings on the base of manifold plates of hot runners 33 and 34 to provide a secure water supply to the hot runners 33 and 34.

Figure 4:
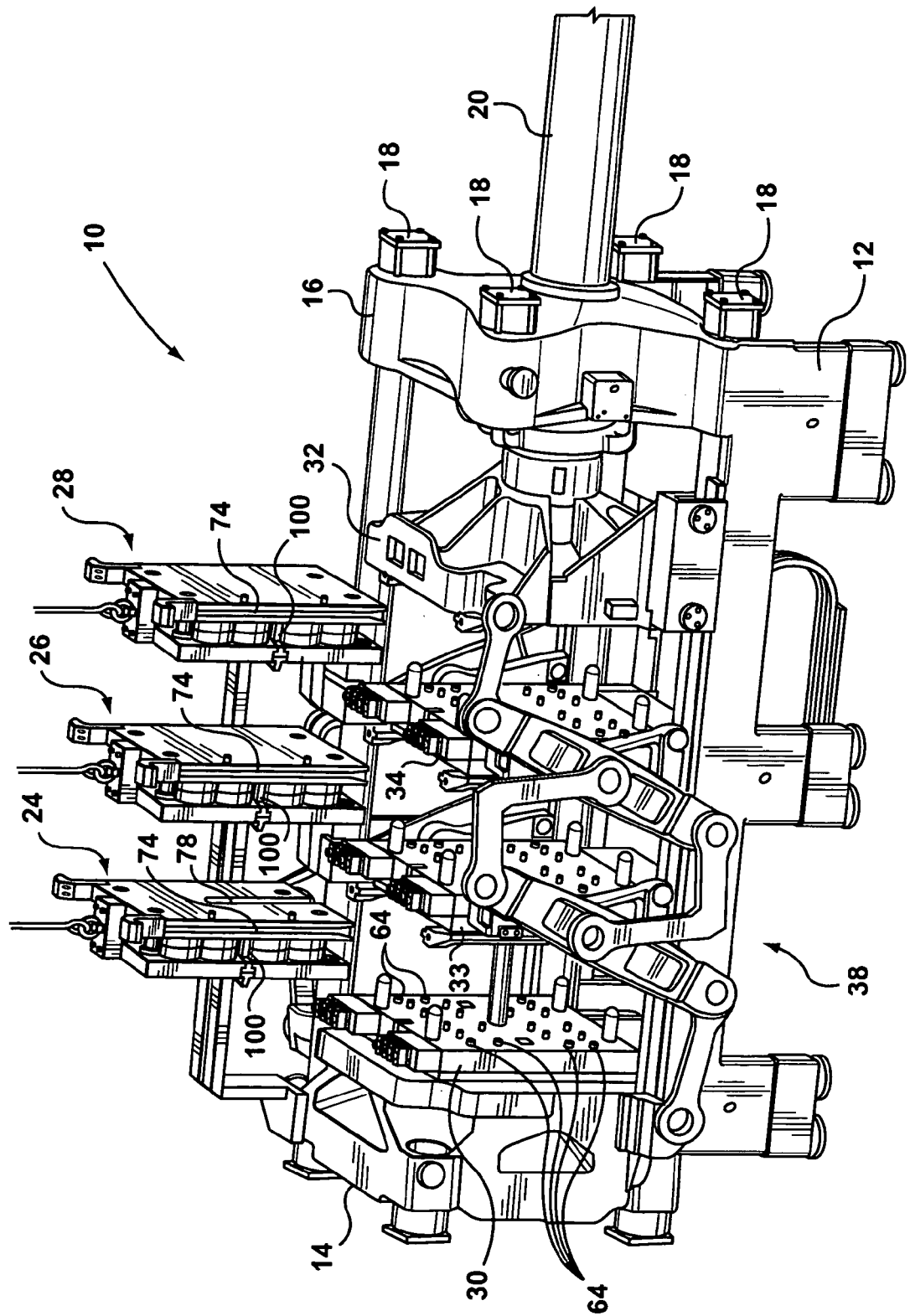
FIG. 4 is a rear perspective view of the injection-molding machine with the three hot runners mounted in the machine and the moldsets in position to be loaded into the machine.
Figure 5:
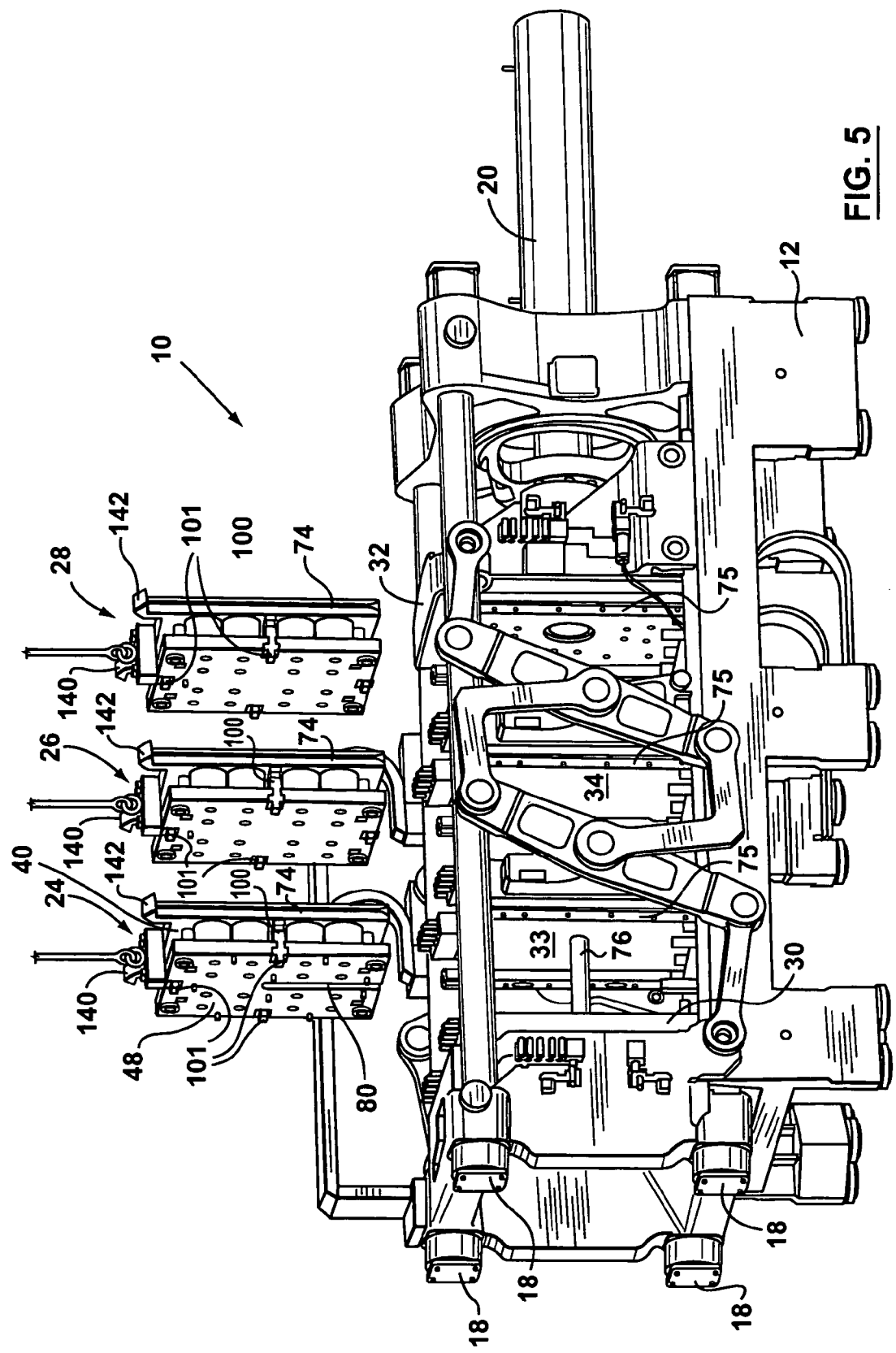
FIG. 5 is a second rear perspective view of the machine with the moldsets in position to be loaded into the machine.
Figure 6:
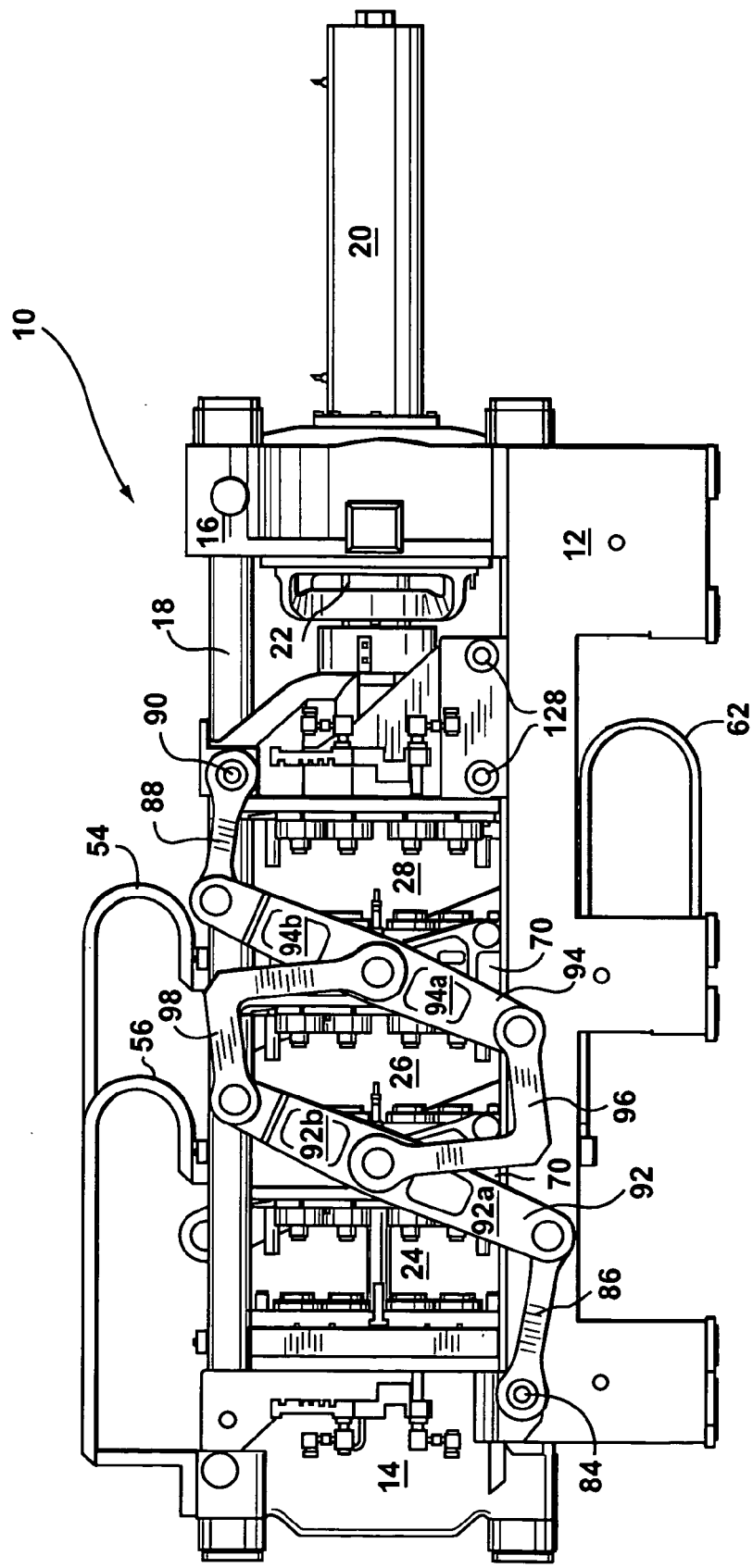
FIG. 6 is a rear side view of a three level stack mold injection-molding machine with the mold open.
Figure 7:
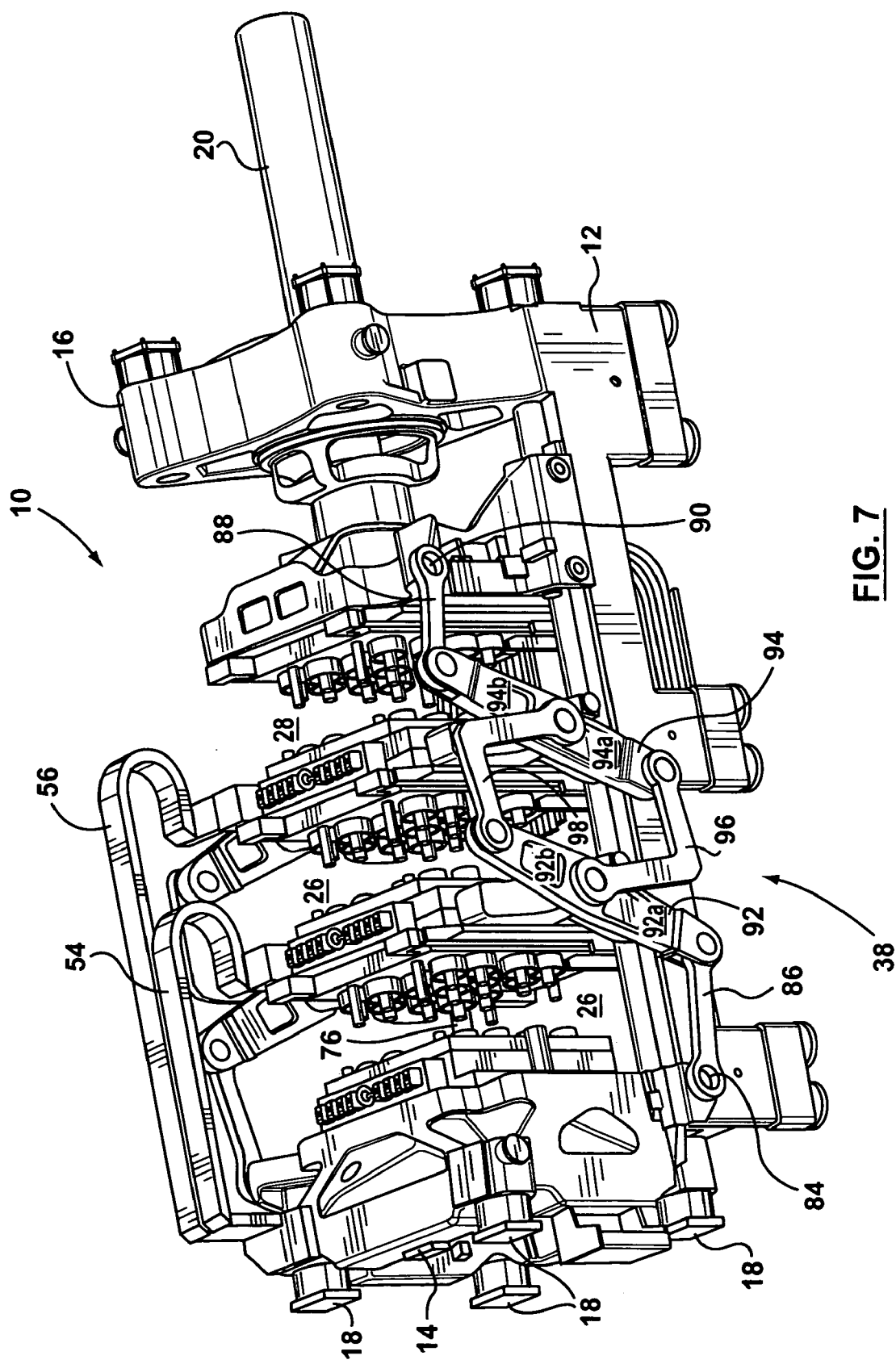
FIG. 7 is a rear perspective view of a three level stack mold machine with the mold open.

FIGS. 4 and 5 show the machine 10 with the movable platen 32, movable hot runners 33 and 34 and fixed hot runner 30 installed and the moldsets 24, 26 and 28 positioned over the machine ready to be loaded into the machine 10. Each core plate in each moldset 24, 26 and 28 has a guide slot 74. Each guide slot 74 engages a guide bar 75 on the movable platen 32 or one of the movable hot runners 33 or 34.

In the embodiment shown in the Figures, a central sprue bar 76 extends through the moldset 24. To enable the moldset 24 to be loaded into the machine 10, slots 78 and 80 are provided in the core plate 48 and cavity plate 40 of moldset 24.

The guide slots 74 on each side of the core plate include core plate separation blocks 140 and 142. The operation of these separation blocks 140 and 142 will be more fully described hereinafter.

FIGS. 6 to 9 illustrate the construction and operation of the linkage assembly for moving the mold between the open and closed positions. There are two assemblies 38 on the machine. The first assembly 38 shown on the back of the machine 10 in FIGS. 6 and 7 has an anchor point 84 at the base of stationary platen 14 for the short pivoting arm 86. A second short pivoting arm 88 is connected to anchor point 90 near the top of movable platen 32. Extending arms 92 and 94 are pivotally connected to carriers 70 at the mid-point of the carriers 70. The lower end of arm 92 is pivotably connected to arm 86 and the upper end of arm 94 is pivotably connected to arm 88. Two curved or L-shaped arms 96 and 98 connect the arms 92 and 94 together.

The lengths of the linking arms 86, 88, 92, 94, 96 and 98 are adjusted so that the moldsets 24, 26 and 28 open and close simultaneously and the linking arms 86, 88, 92, 94, 96 and 98 do not interfere with side access to the open mold. In the present embodiment, the lower portion 92a of arm 92 is longer than the upper portion 92b. For arm 94, the upper portion 94b is longer than the lower portion 94a. The arms 96 and 98 are curved to ensure that they do not extend across the access to the cores and cavities when the mold is open.

Figure 8:
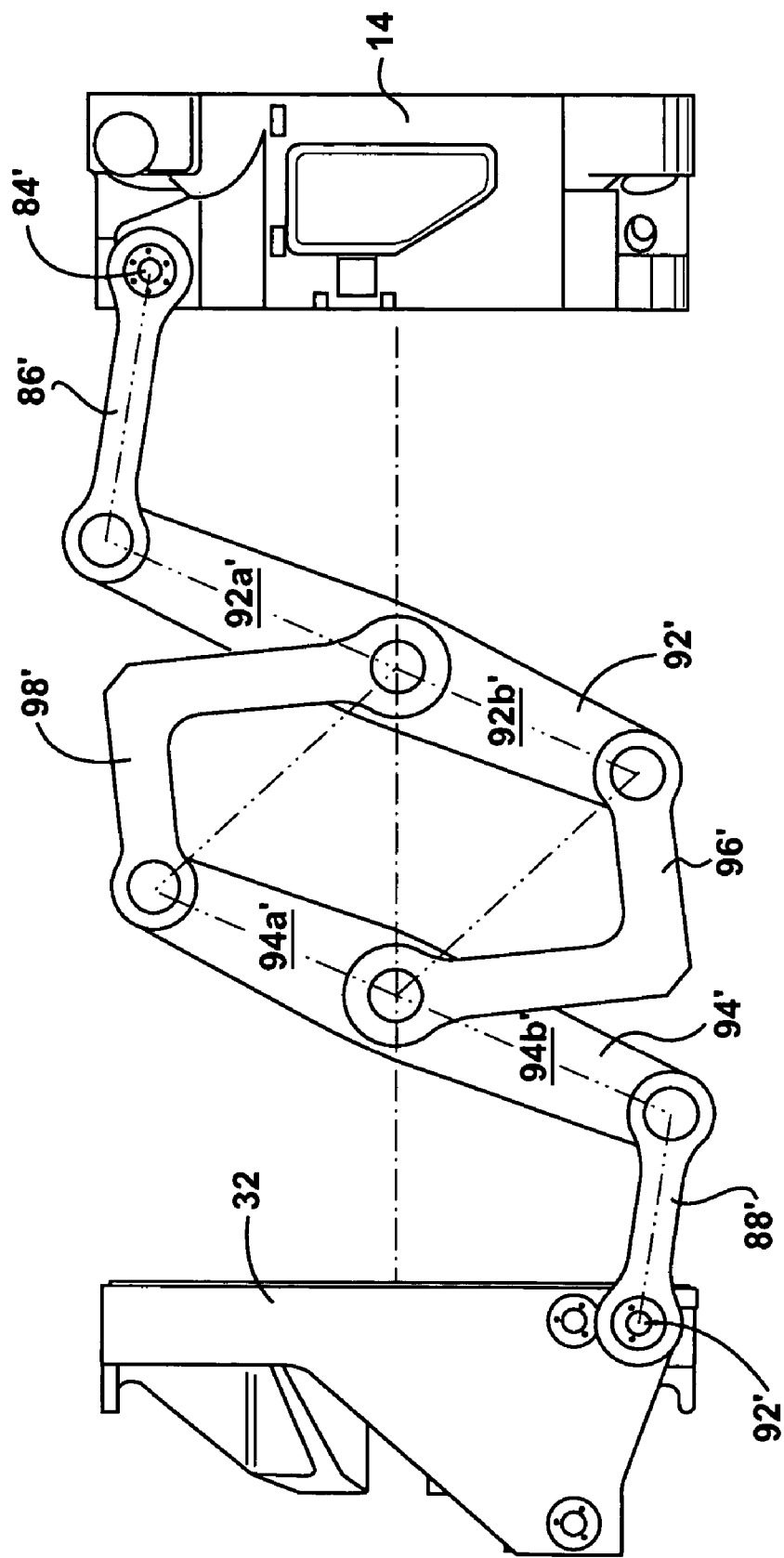
FIG. 8 is a schematic side view of a linkage assembly for the front of a three level stack mold showing the assembly when the mold is open.
Figure 9:
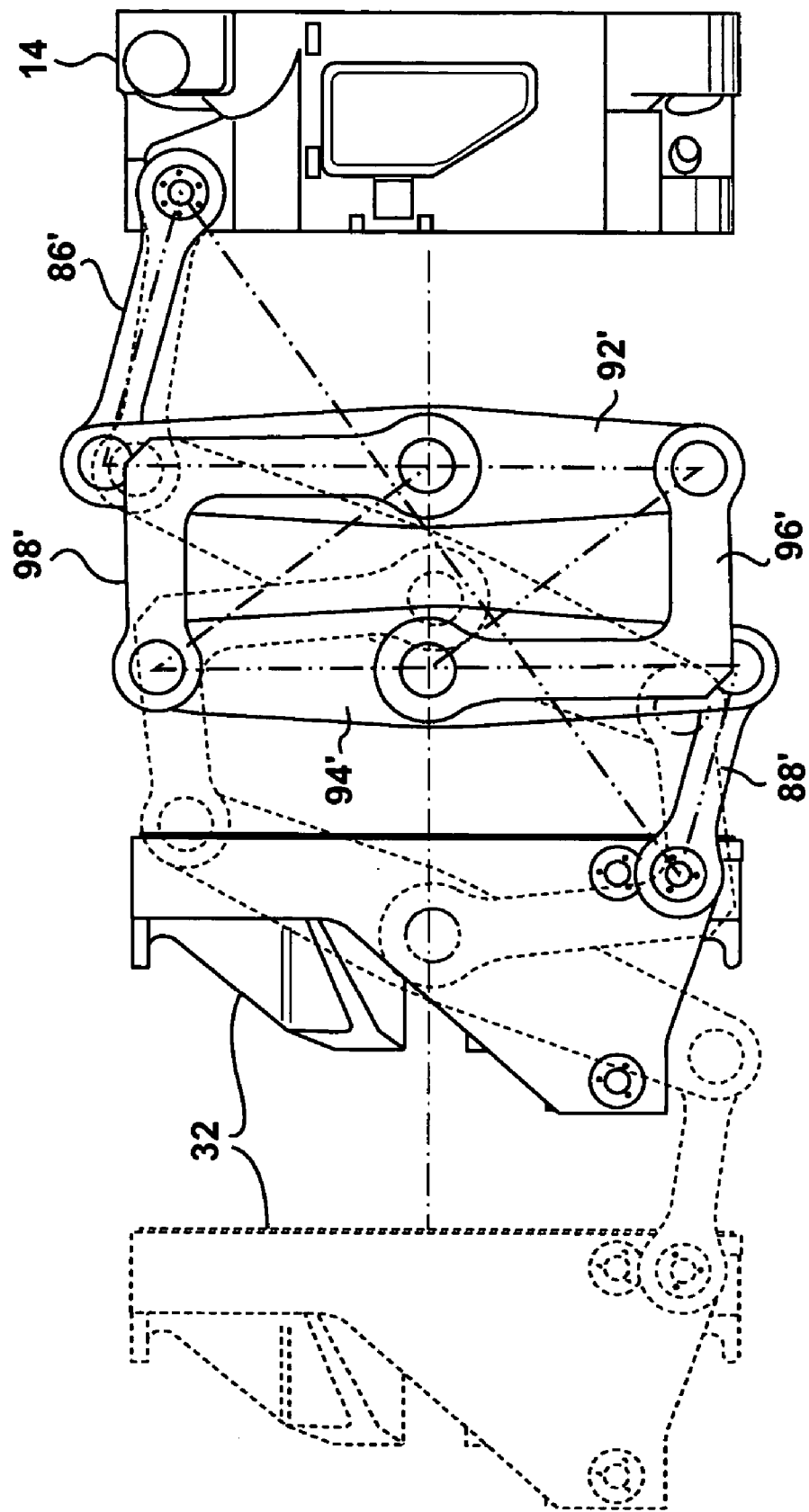
FIG. 9 is a schematic side view of the linkage assembly for the front of the machine showing the linkage when the mold is open and when the mold is closed.

The linkage assembly 38 at the front of the machine is the reverse of the assembly 38 on the back of the machine. To emphasize the similarities between the two assemblies, similar elements have been designated with a prime. As shown in FIGS. 8 and 9, arm 86' is connected to an upper anchor point 84' on stationary platen 14 and arm 88' is connected to a lower anchor point 92' on movable platen 32. Extending arms 92' and 94' are pivotably connected to carriers (not shown) on the machine in the same manner as arms 92 and 94. However, the longer portion 92a' of arm 92' is the upper portion of the arm and the longer portion 94b' is the lower portion of arm 94'. By reversing the two assemblies 38, the forces driving the molds between the open and closed positions are balanced and the molds close uniformly.

The linking arms 86', 88', 92', 94', 96' and 98' are also dimensioned so that they do not interfere with access to the cores and cavities when the mold is open. Thus, the molding machine provides ready access to the open molds from above, below and both sides. As will become apparent hereinafter, this enables the rapid and simple ejection of molded parts and easy and rapid replacement of moldsets.

Figure 10:
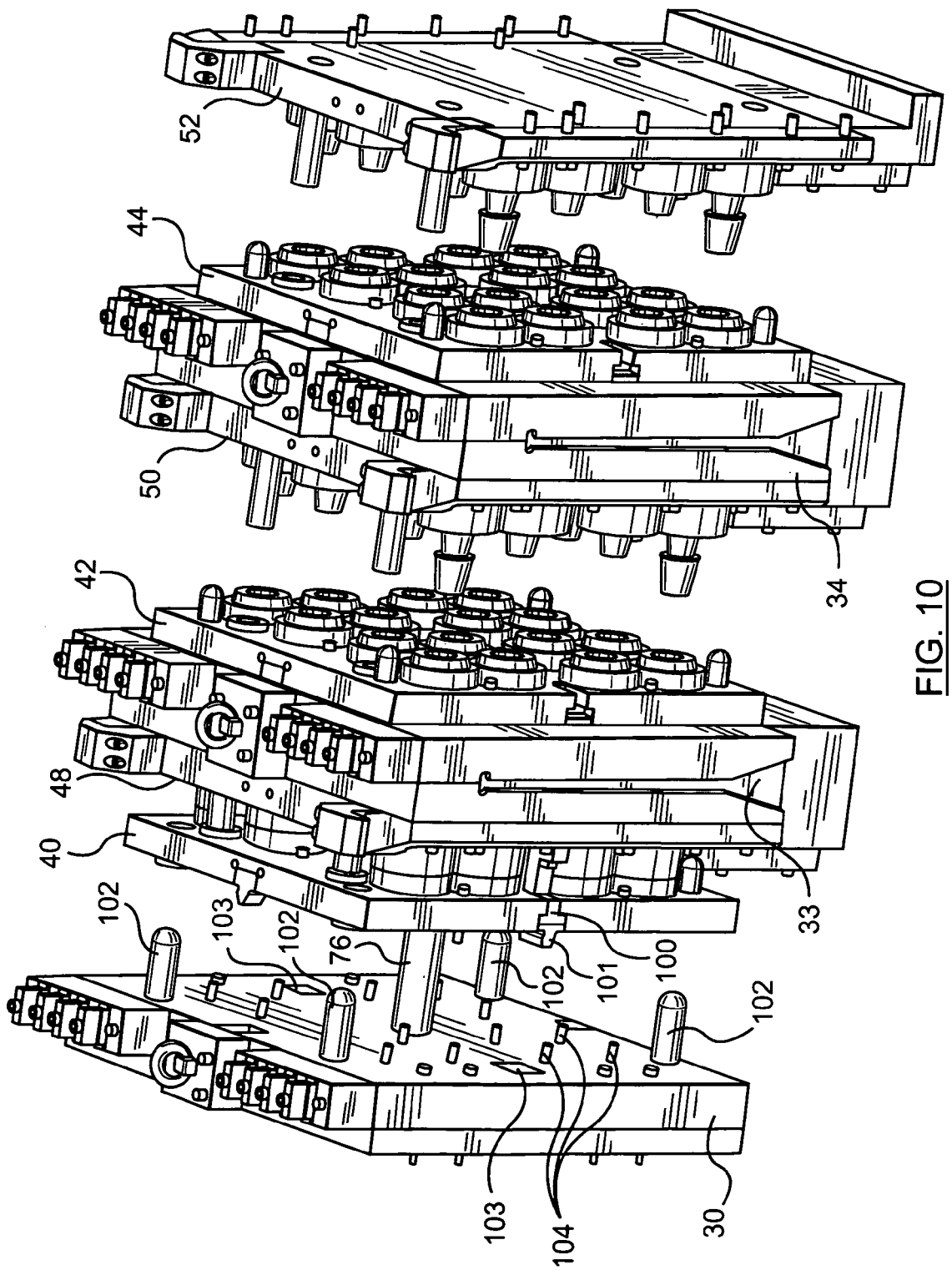
FIG. 10 is a perspective view of the mold for a three level stack-molding machine in a partially assembled condition.

FIG. 10 shows the cavity plates 40, 42, and 44, core plates 48, 50 and 52 and the fixed hot runner 30 and movable hot runners 33 and 34 separate from the injection-molding machine. Cavity plate 40 is attached to core plate 48 by latches 100 (only one shown). Each hot runner includes four hot runner leader pins 102 to align the respective cavity plate with the hot runner. Hot runner nozzles 104 extend out of each hot runner and into the associated cavity plate. Four straight interlocks 101 at the midsection of each cavity plate 42 and 44 interface with matching slots 103 on the respective hot runners. Cavity plate 40 only has three interlocks 101 because a slot 80 is formed in the plate 40 to permit the plate 40 to slide over the sprue bar 76. The leader pins 102 ensure reasonable alignment of the cavity plates with the associated hot runner and the precise shape of the interlocks 101 and slots 103 tightly align the nozzles 104 with the gates of the cavities in the cavity plates. The outermost ends of the interlocks 101 are slightly tapered to ensure that the interlocks 101 enter into the slots 103 and do not have sharp corners that can impact on one another and cause damage. This ensures that the moldsets can be changed often without the creation of alignment concerns over time.

Figure 11:
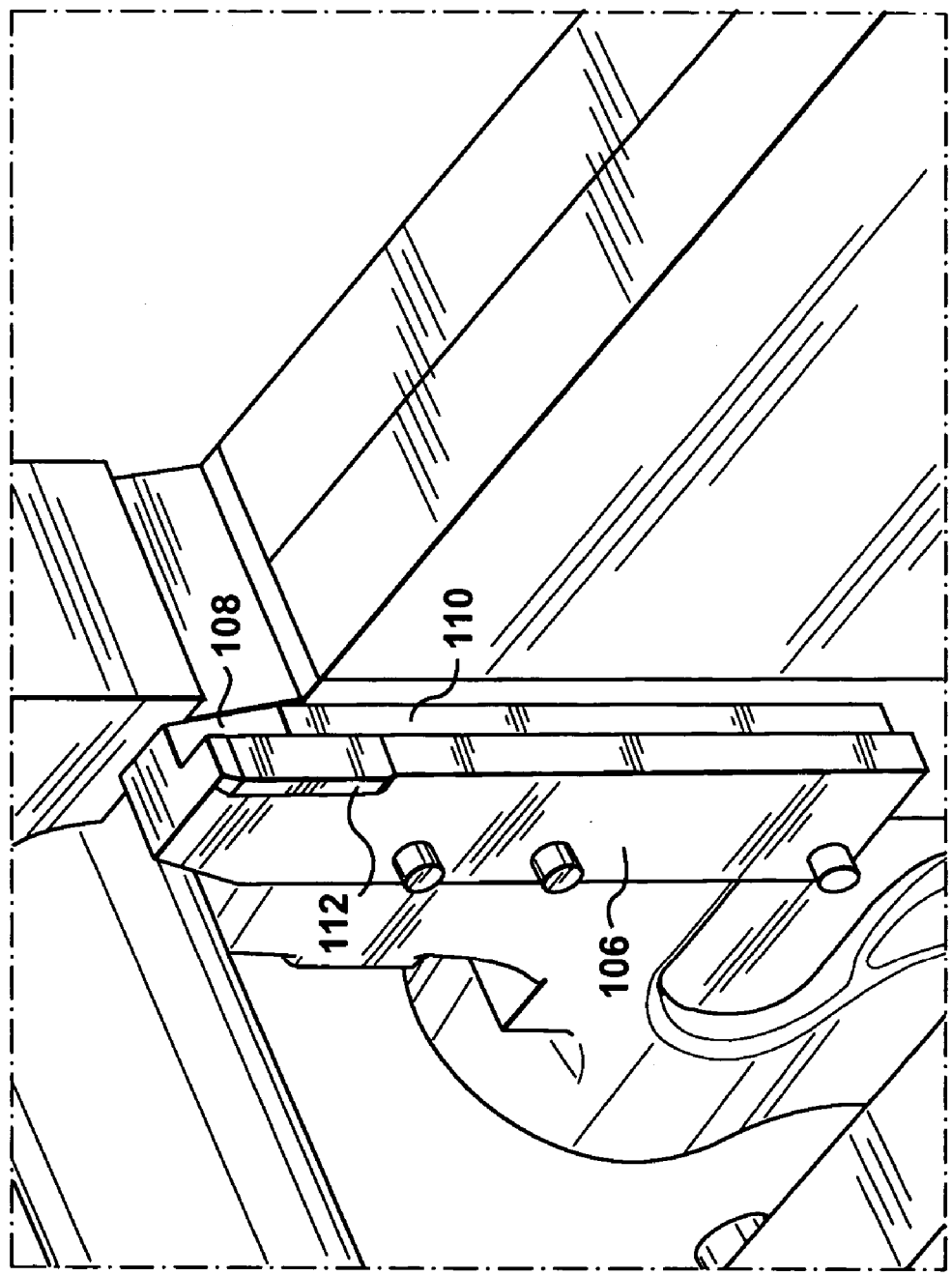
FIG. 11 is a perspective view of a portion of the guide assembly for the core plate.

One embodiment of the guide slots for guiding the core plates onto the hot runners 33 and 34 is shown schematically in FIG. 11. At the top of each hot runner 33 and 34 and movable platen 32 is a guide plate 106. The guide plate 106 has a tapered surface 108 for receiving and guiding the core plate into the receiving slot 110. A slightly raised surface 112 on the outer surface of each guide plate 106 forces the core plate away from the hot runner or movable platen so that the core plate does not scuff against the hot runner plate or the movable platen as it is being guided and loaded onto the machine.

Figure 12:
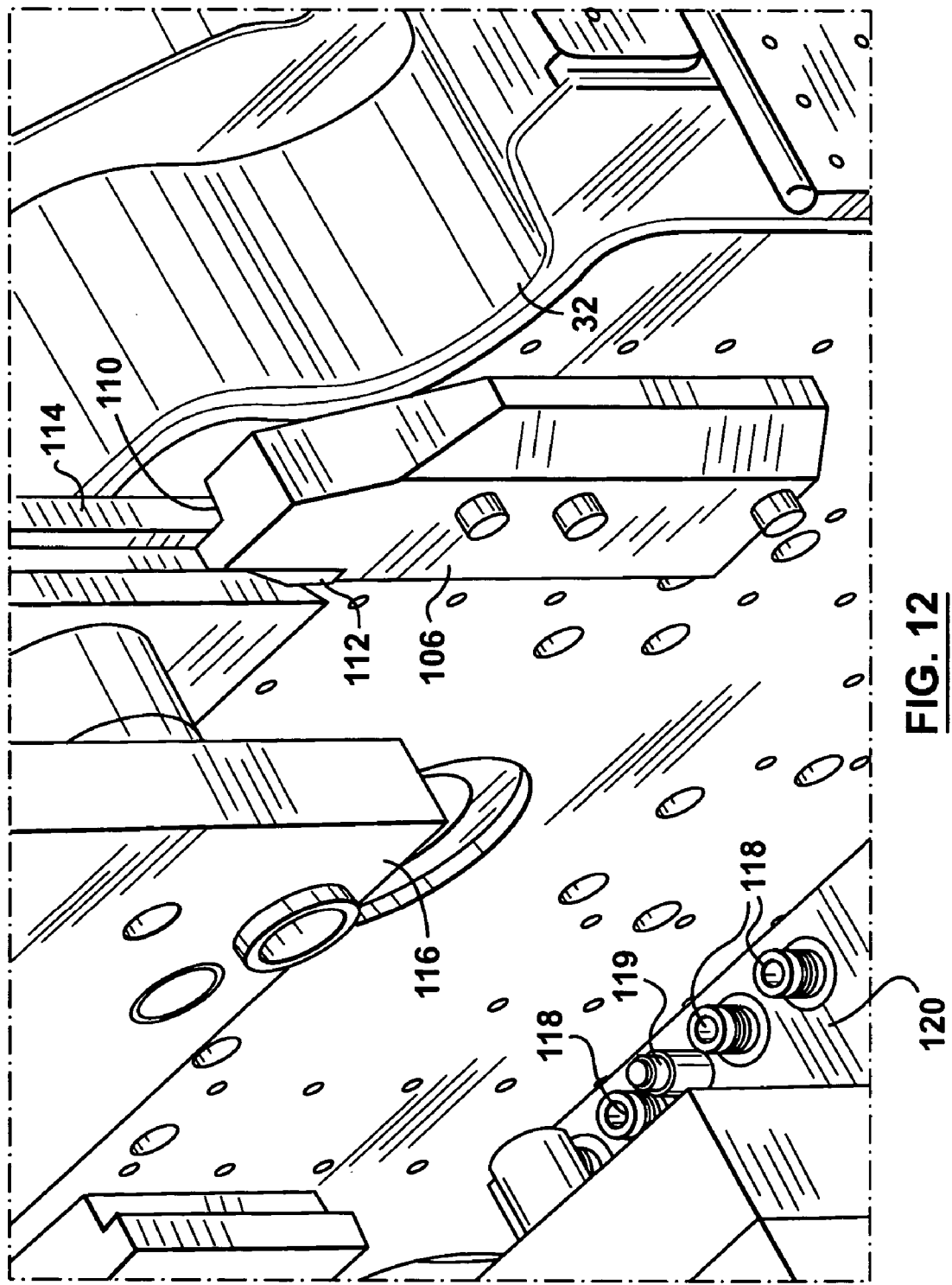
FIG. 12 is a perspective view of the guide assembly with a core plate entering the guide assembly.

FIG. 12 shows a core plate 114 being guided into a slot 110 and being pushed slightly away from the surface of the movable platen 32 by the raised surface 112. A cavity plate 116 is attached to the core plate 114. Water connections or nipples 118 extend from the water manifold 120 and will engage in connectors on the base of the core plate 114 when the core plate is placed in molding position. Guide pin 119 guides the core plate 114 onto the water manifold 120 to ensure a secure connection of the connectors 118 to the female connectors on the core plate 114.

Figure 13:
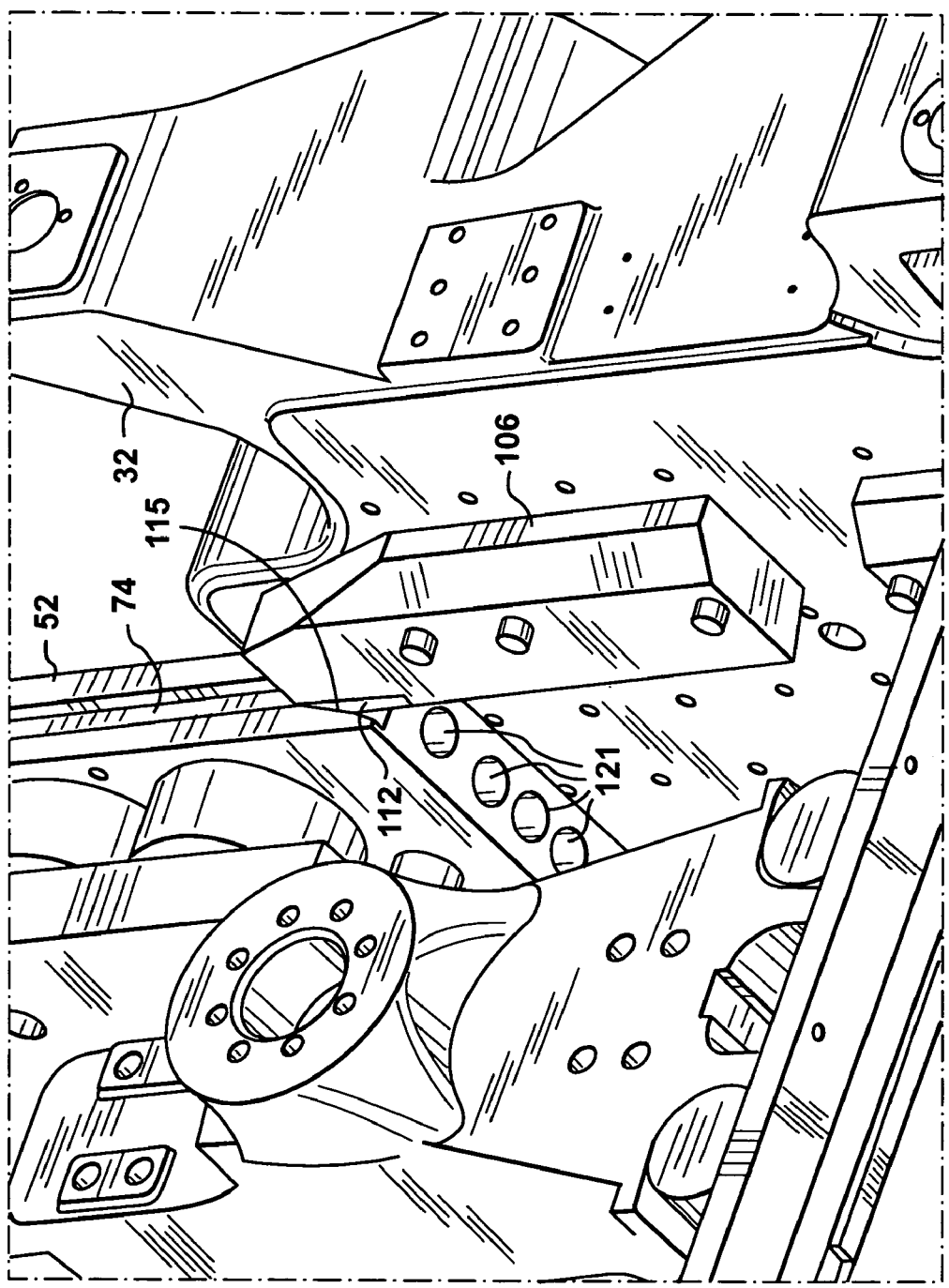
FIG. 13 is a bottom perspective view of the guide assembly and core plate.

FIG. 13 is a partial assembly showing the guide slot 74 on core plate 52 just entering the guide plate 106. The tapered surface 115 at the front edge of slot 74 permits the core plate 52 to align with the guide plate 106. The raised surface 112 on the guide plate 106 moves the core plate 52 away from the surface of the movable platen 32 so the core plate 52 does not scuff against the surface of the platen 32 as it is being loaded into the machine. The female connectors 121 on the underside of core plate 52 engage connectors 118 when the core plate is fully loaded into the movable platen 32.

Figure 14:
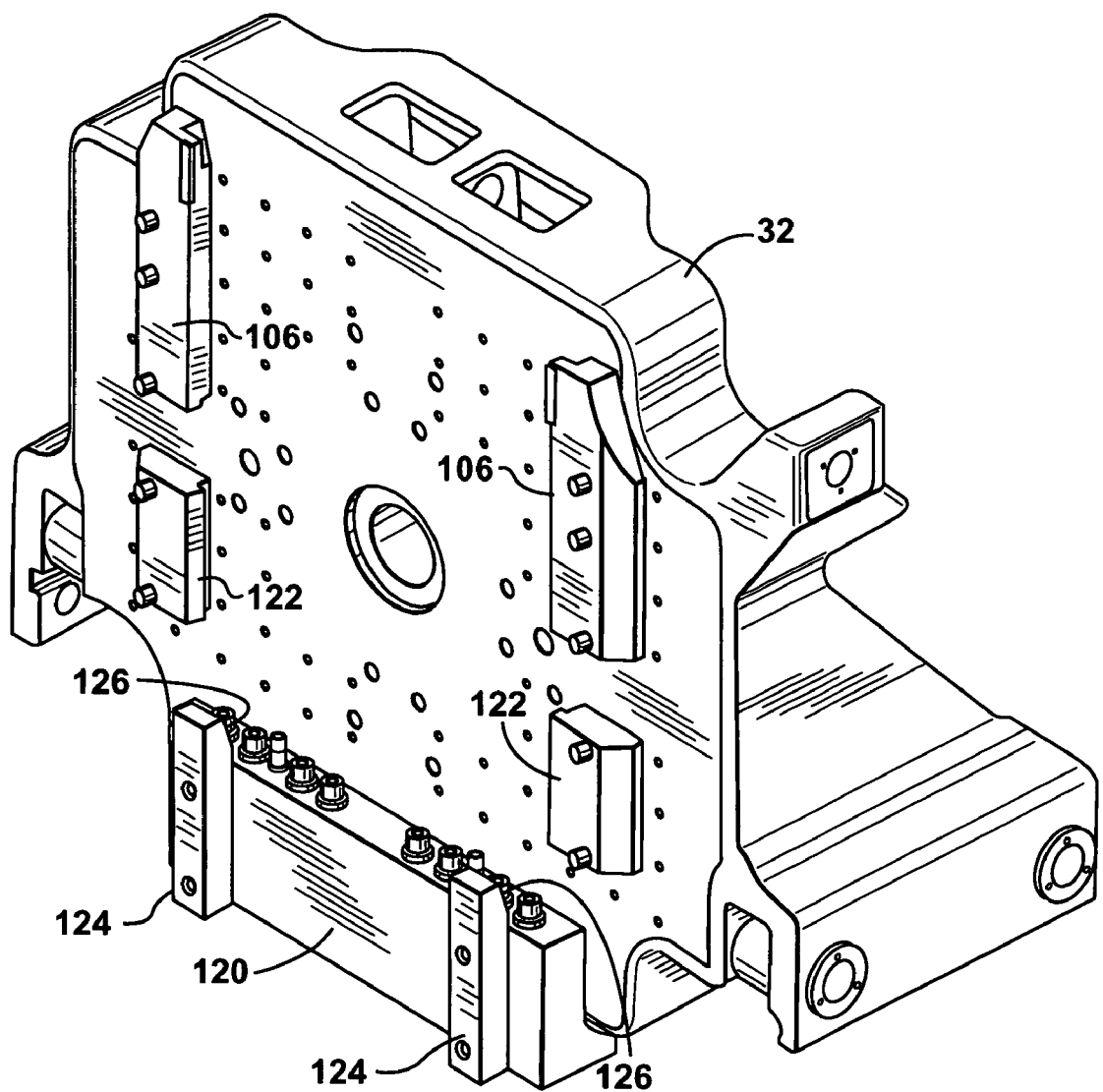
FIG. 14 is a perspective view of the movable platen with core plate guides.

FIG. 14 is a perspective view of the movable platen 32 with the guide plates 106 and 122 installed. The guide plates 106 are mounted on an upper portion of the platen 32 and lower guide plates 122 are mounted on a lower portion of the platen 32. Wedge plates 124 are mounted on water manifold 120. A wedging surface 126 is formed on the upper end of plates 124 and engage the front face of the core plate when it is nearing its fully mounted position. The wedging surfaces 126 force the core plate into firm contact with the platen 32. It is noted that each core plate is loaded in this same manner so it is unnecessary to describe the loading operation for the other two core plates onto the movable hot runners 33 and 34.

Figure 15:
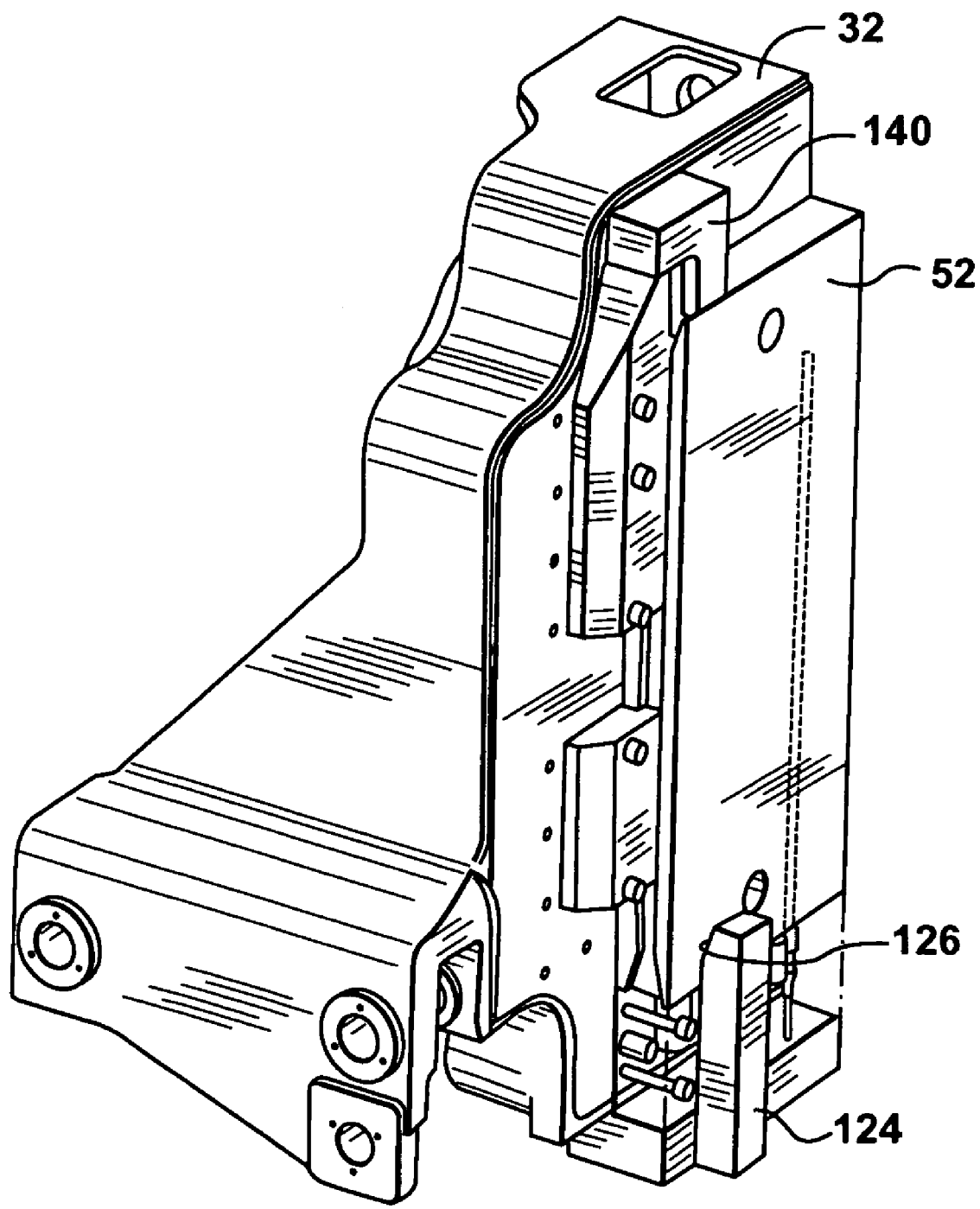
FIG. 15 is a partial perspective view of a movable platen with a core plate fully engaged with the platen.

FIG. 15 shows the core plate 52 fully installed on platen 32 and wedged tightly against platen 32 by wedge surface 126 on wedge plate 124 and a wedging surface on the separation block 140. The separation block 140 is more fully described hereinafter.

Figure 16:
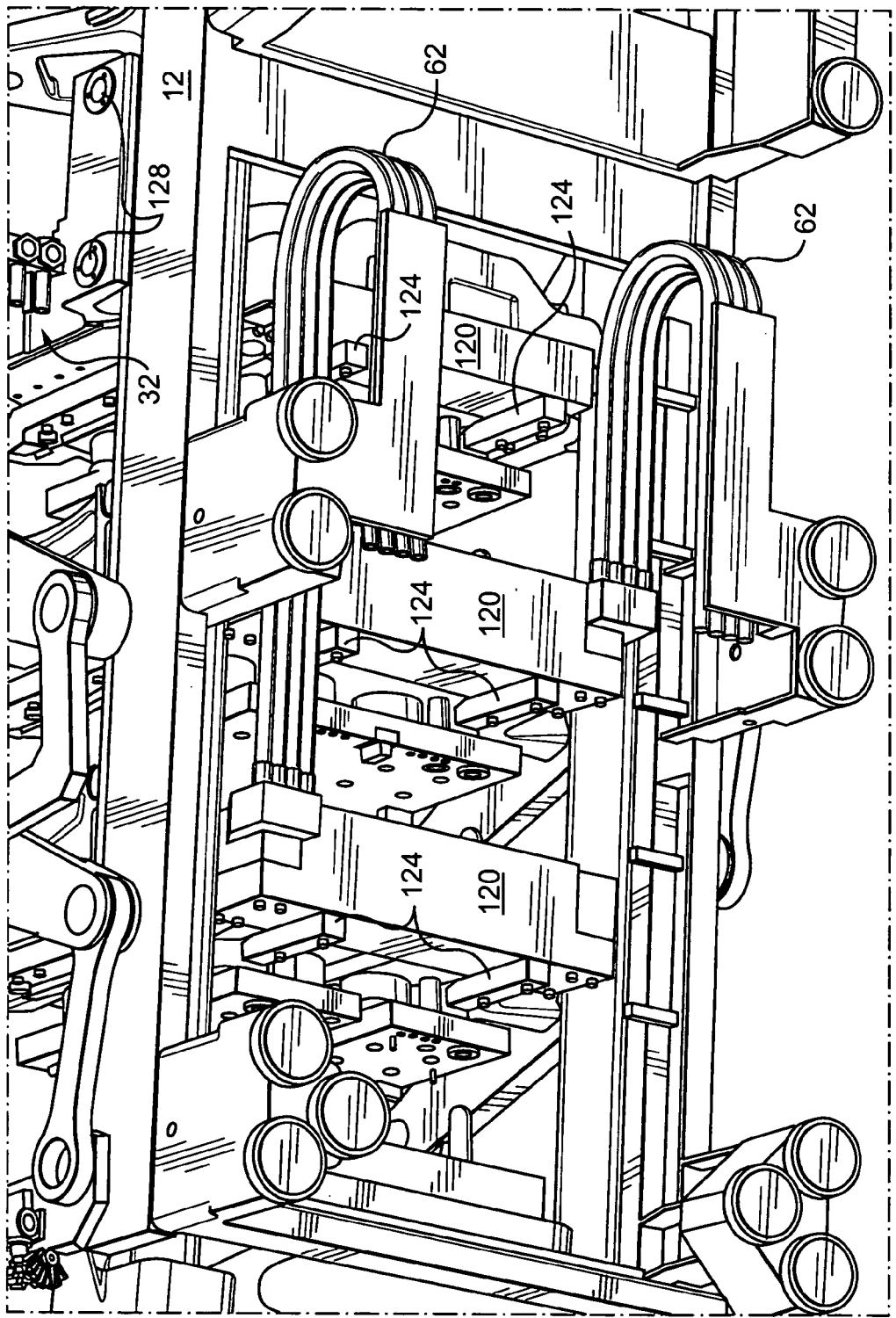
FIG. 16 is a bottom perspective view of the molding machine.

FIG. 16 shows the flexible water lines 62 extending to the manifolds 120 on each hot runner. One set of lines 62 extends under tiebars 18 on one side of the machine and the other set of lines 62 extends along the underside of the other lower tiebar 18. Lines 62 are out of the way of the mold opening so parts can be dropped downwardly without encountering interference from any components of the machine.

Figure 17:
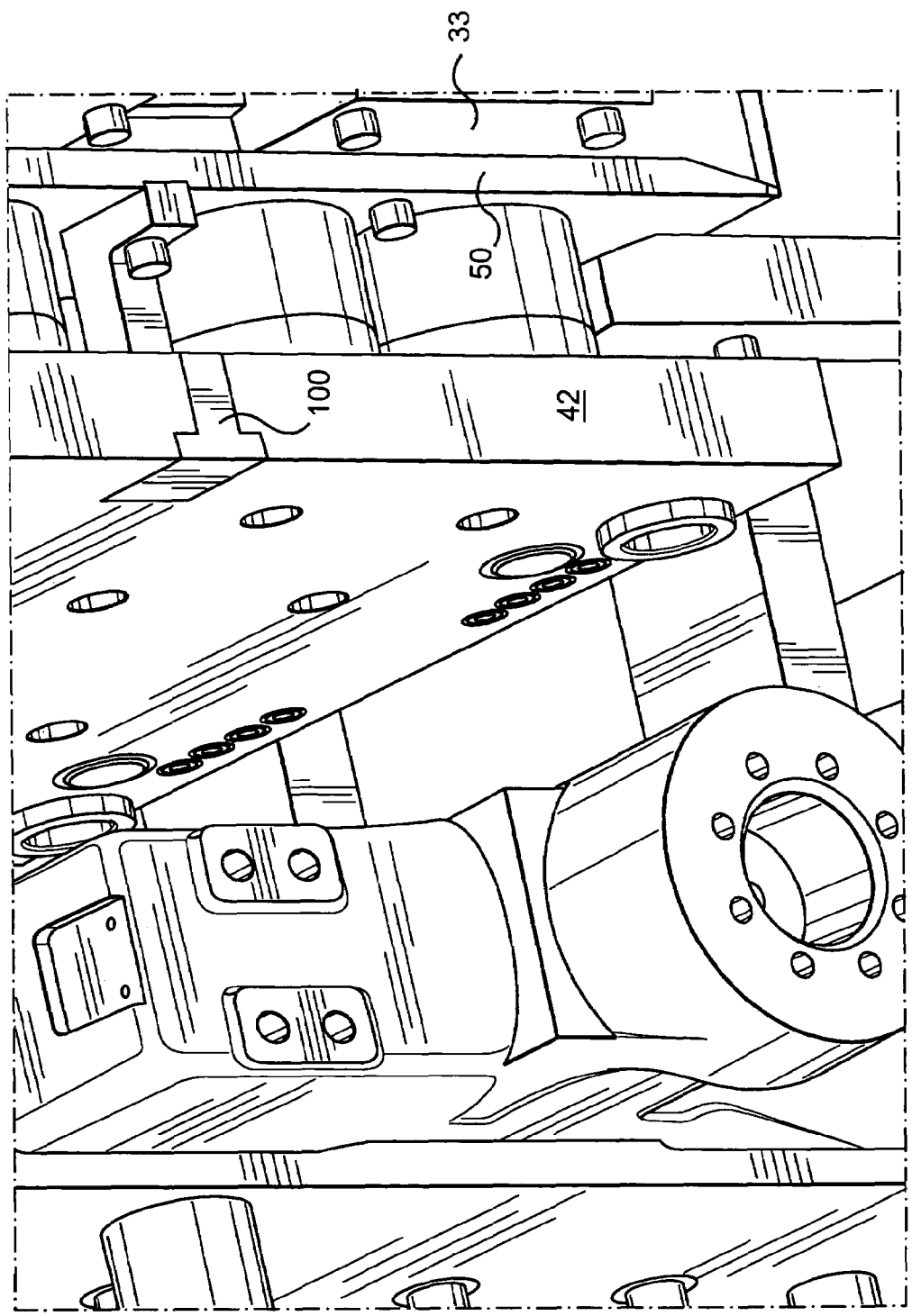
FIG. 17 is a perspective view of a moldset partially loaded into a machine.
Figure 18:
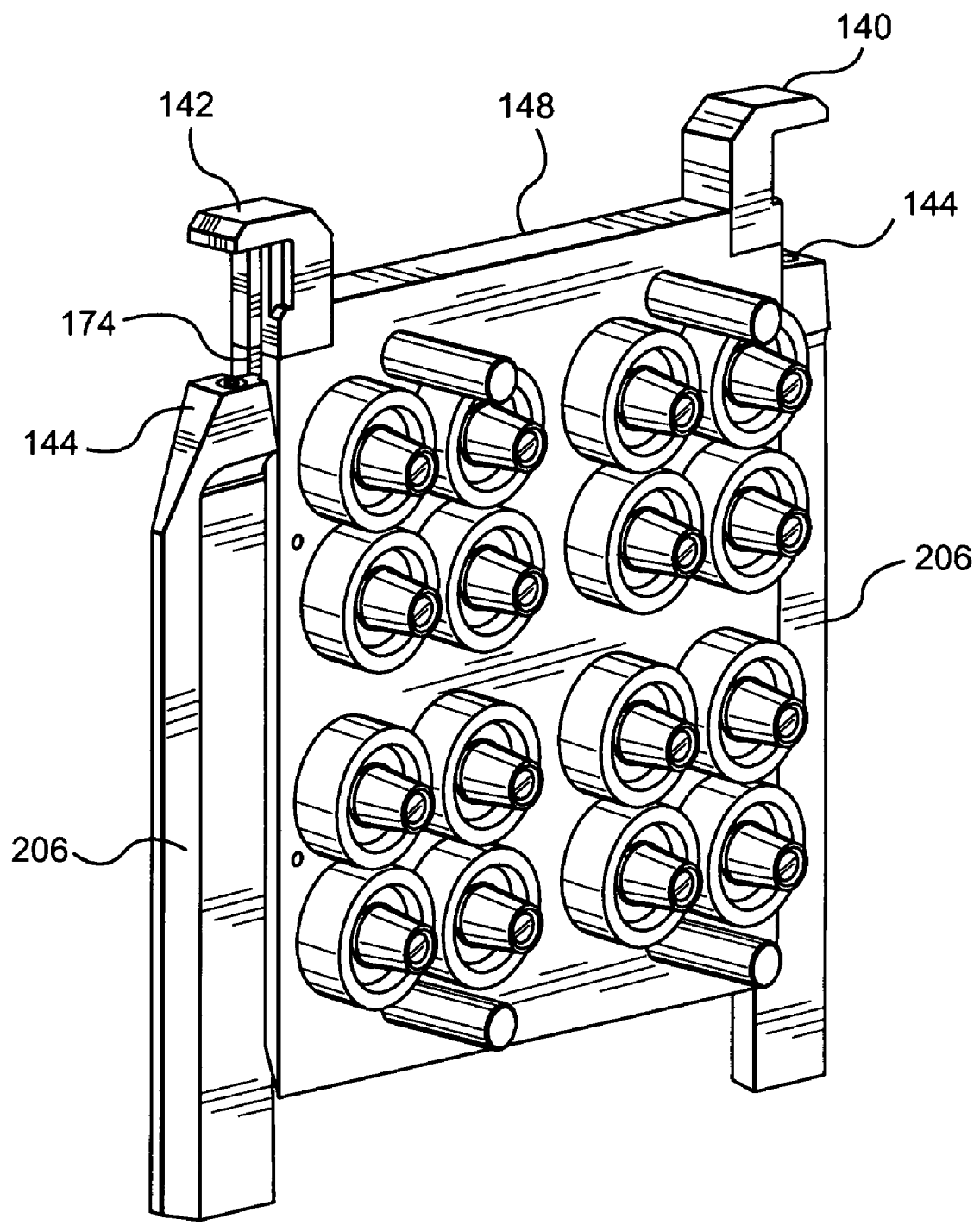
FIG. 18 is a perspective view of a core plate with guides and a core plate separation block.
Figure 19:
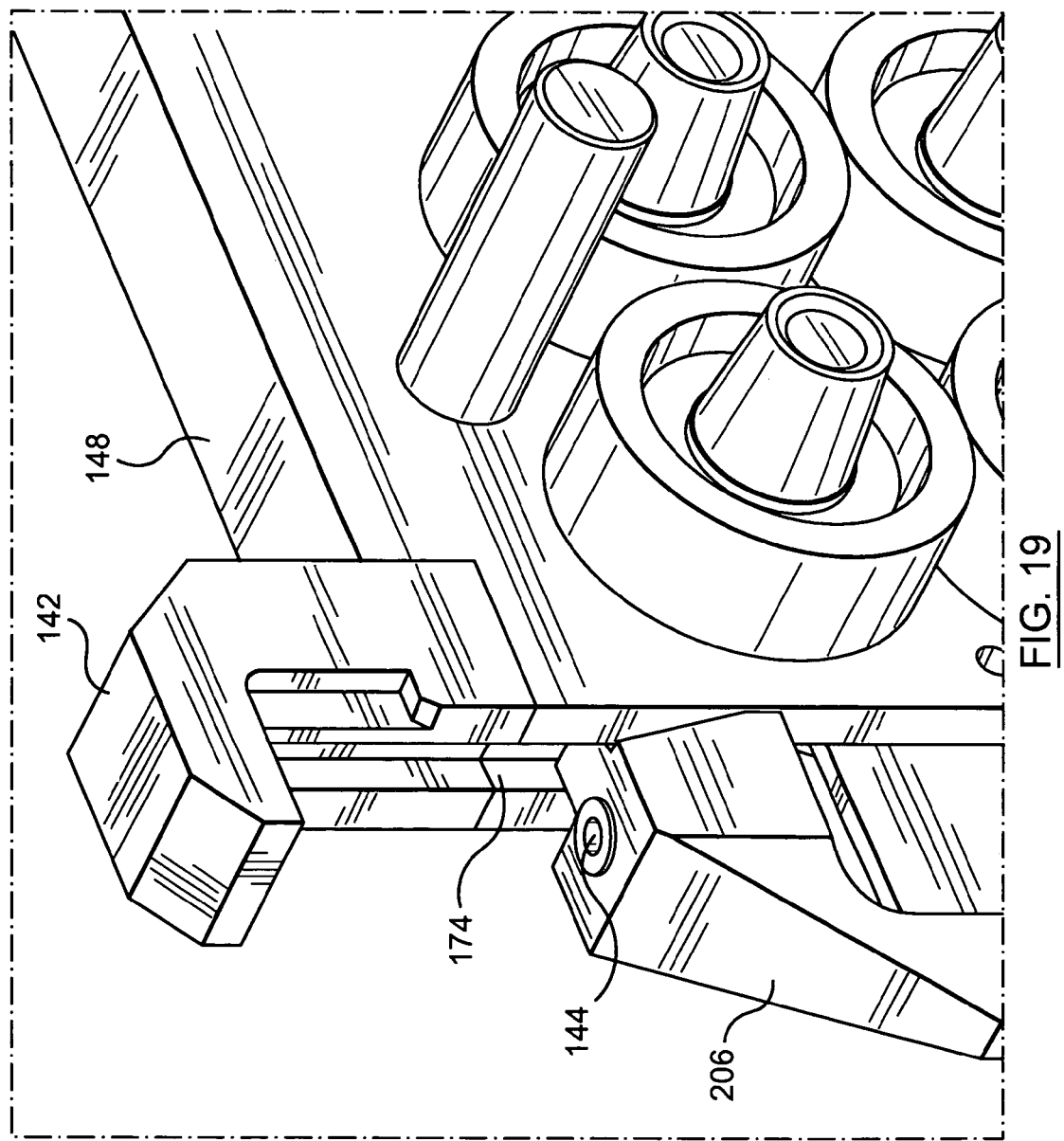
FIG. 19 is an enlarged view of a part of the core plate and the core plate separation block.

FIG. 17 shows a core plate 50 secured to movable hot runner 33. Cavity plate 42 is secured to core plate 50 by latches 100 (only one shown) and is ready to be secured to the hot runner plate.

With this new design, the replacement of molds and servicing of the machine are much simplified over earlier designs First, the mold guides 106 and 122 are installed on the movable platen 32 and movable hot runners 33 and 34. The water manifolds 120 and wedge plates 124 are also installed on the movable platen 32 and movable hot runners 33 and 34. The water manifolds 120 are installed on carriers 70 and the flexible water lines 62 attached from below. As shown in FIG. 3, the movable hot runners 33 and 34 are each installed on carriers 70 and the hot runner 30 is bolted to the fixed platen 14. Next, as shown in FIG. 5, the moldsets 24, 26 and 28 are lowered onto the hot runners 33 and 34 and the movable platen 32, one at a time. A dial indicator, to be described hereinafter, is provided to indicate when the moldset is properly seated and the air and water connections are secure. When the moldset is in place it is bolted to its associated platen or hot runner and the crane hook is removed. After all three moldsets have been bolted, the machine is slowly closed to permit the cavity plates 40, 42 and 44 to engage hot runner leader pins 102, straight interlocks 101 and hot runner nozzles 104. Clamp tonnage is then applied and each cavity plate is partially bolted to the hot runner associated with it. The bolts are sufficient in number to ensure that the cavity plate is secure when separated from the core plate. The stack mold carrier to hot runner bolts are now tightened. At this point, the latches 100 and the moldset lift bars are removed. The molds can now be slowly opened with the core plates separating from the cavity plates. When the molds are open the remaining cavity plate bolts can be tightened and the electrical cables attached to the top of the hot runners. The machine is now ready to mold parts.

When replacement of the moldsets is required, the procedure is reverse. The mold is opened and latches 100 are slid onto the cavity plates. Most of the bolts securing the cavity plate to the hot runner are removed. The remaining bolts need only hold the cavity plate in position. The mold is closed and the latches 100 are attached to the core plate. The remaining bolts securing the cavity plate to the hot runner are removed and the mold is opened. The bolts attaching the core plate to its associated moving platen 32 or hot runner are removed. Now the crane hook can be attached to the moldset and the moldset removed from the machine.

The injection molding machine provides pre-assembled moldsets for each family of parts to be molded so that the moldsets can be changed quickly and efficiently. The guided moldset loading ensures that the moldsets install with minimal operator intervention. The hose-less coupling of the services ensures quick, sure and easy coupling of services to the machine and moldsets. The open linkage assembly ensures that parts can be readily retrieved by a robot from either side of the machine or simply freely dropped through the bottom of the machine. The robot could even enter from atop the machine.

FIGS. 18 to 21 illustrate apparatus for automatically connecting air supplies to the core plate. The apparatus also provides guide surfaces to keep the core plate away from the hot runner or platen faces during loading of the core plate and positively moving the core plate toward the platen or hot runner face when the core plate is near the end of travel. During removal, the apparatus moves the core plate away from the platen or hot runner face at the start of travel. The apparatus also provides means for indicating the positive loading of the core plate. In this embodiment, the core plate 148 has guide slots 174 for guiding the core plate 148 onto guide plate 206 in the same manner as previously described with reference to core plate 48. Core plate 148 includes core plate separation blocks 140 and 142. Each separation block 140 and 142 includes an air channel or channels to provide air to the core plate to enable ejection of parts from the cores on the core plate. This creates a separation of the air supply from the water supply at the base of the core plate thus reducing the possibility of contamination of the air supply in the event that the water supply remains pressurized when a core plate is not in position on the mold. Each guide plate 206 includes an air channel with a discharge outlet 144. As the core plate 148 slides into position, an air opening 138 in the undersurface of each core plate separation block 140 and 142 engages a discharge outlet 144. To ensure that the opening 138 makes an airtight seal with the outlets 144, each outlet 144 has a compressible and pliable exit surface. In some instances, it may be desirable to provide the openings 138 with a similar compressible and pliable surface. A preferred material for the discharge outlets 144 is Ultra High Molecular Weight Polyethylene (UHMWPE).

Figure 20:
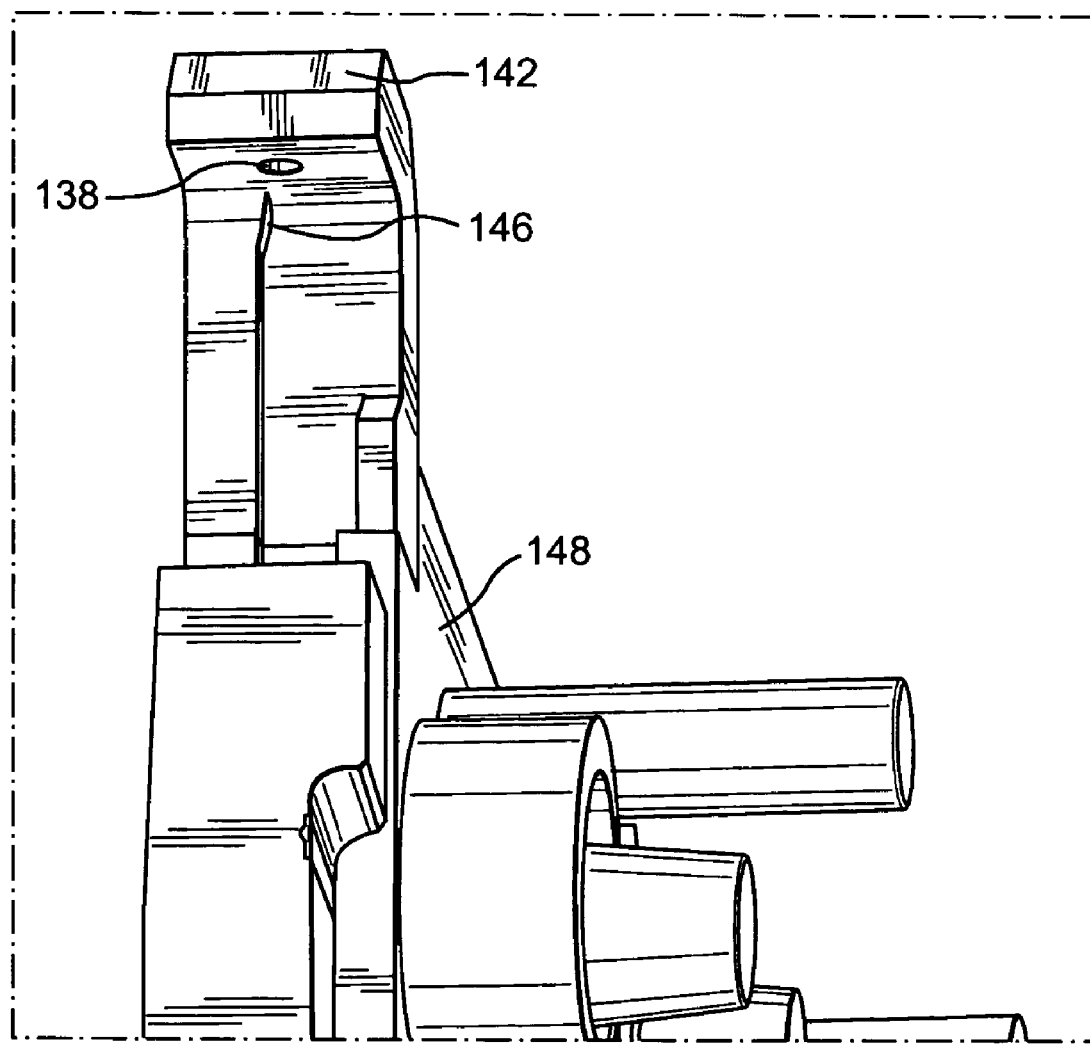
FIG. 20 is side view of the core plate and core plate separation block.

The angular surface 146, shown in FIG. 20, on the separation blocks 140 and 142 engages a camming surface (not shown) on the guide plate 206. The camming surface forces the separation blocks 140 and 142 and joined core plate 148 towards the platen or hot runner when the core plate is nearing its end of travel. A distance of approximately 50 mm from the end of travel is considered a reasonable place for this camming action to start. At the same time as this camming action is initiated, the wedge surfaces 126 on the wedge plates 124 are forcing the lower portion of the core plate 148 toward the face of the hot runner or platen. Thus, the core plate is forced toward the platen or hot runner in an upright manner so that it engages the platen or hot runner face evenly. This camming action also causes the opening 138 to positively engage with the discharge outlet 144.

Figure 21:
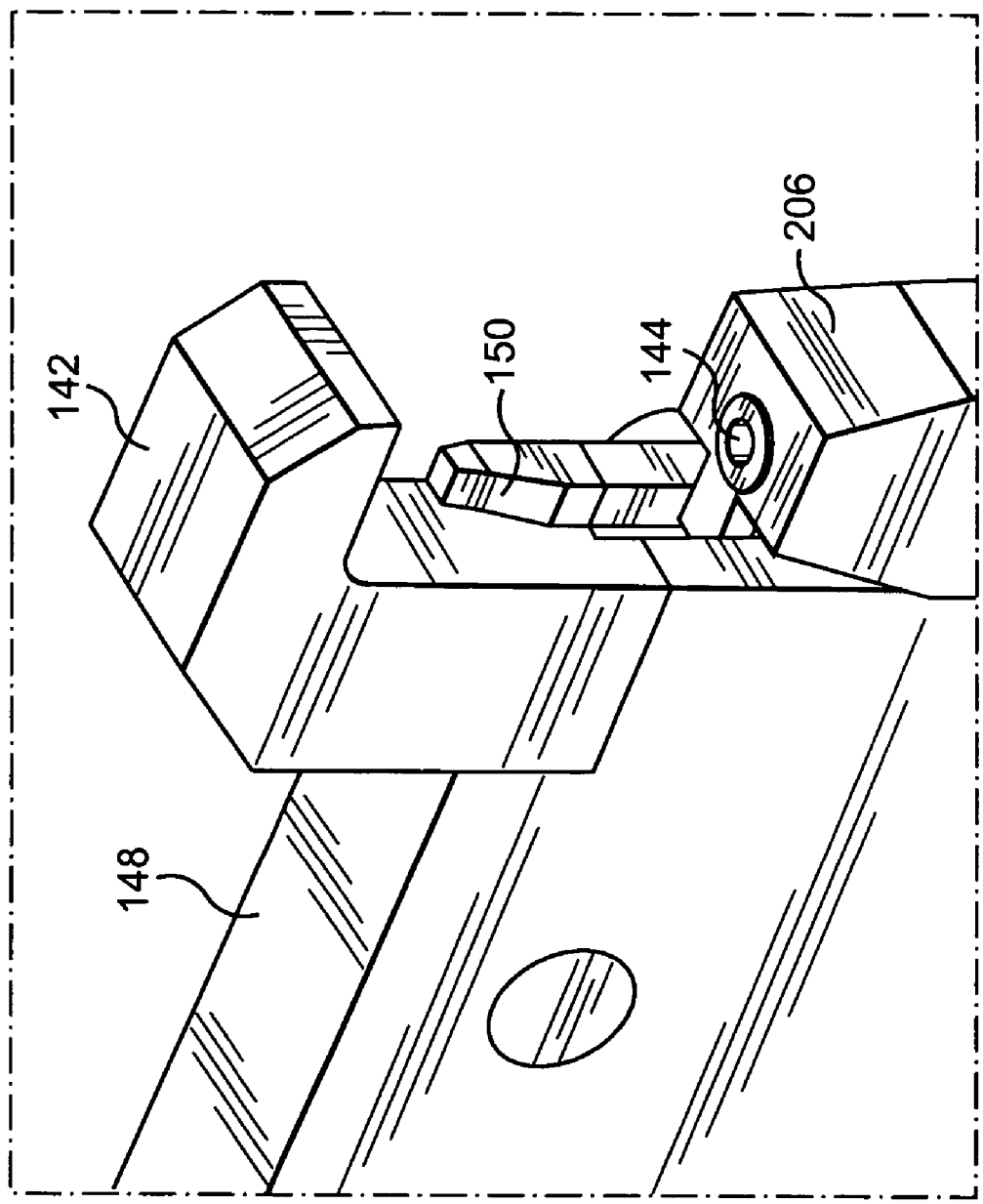
FIG. 21 is a perspective view of the core plate and core plate separation block.

The angular surface 150, shown in FIG. 21, on the core plate separation blocks 140 and 142 acts with corresponding sloped surfaces (not shown) on the guide plates 206 to cam the core plate away from the platen or hot runner face upon initial movement of the core plate during extraction of the core plate from the mold.

Figure 22:
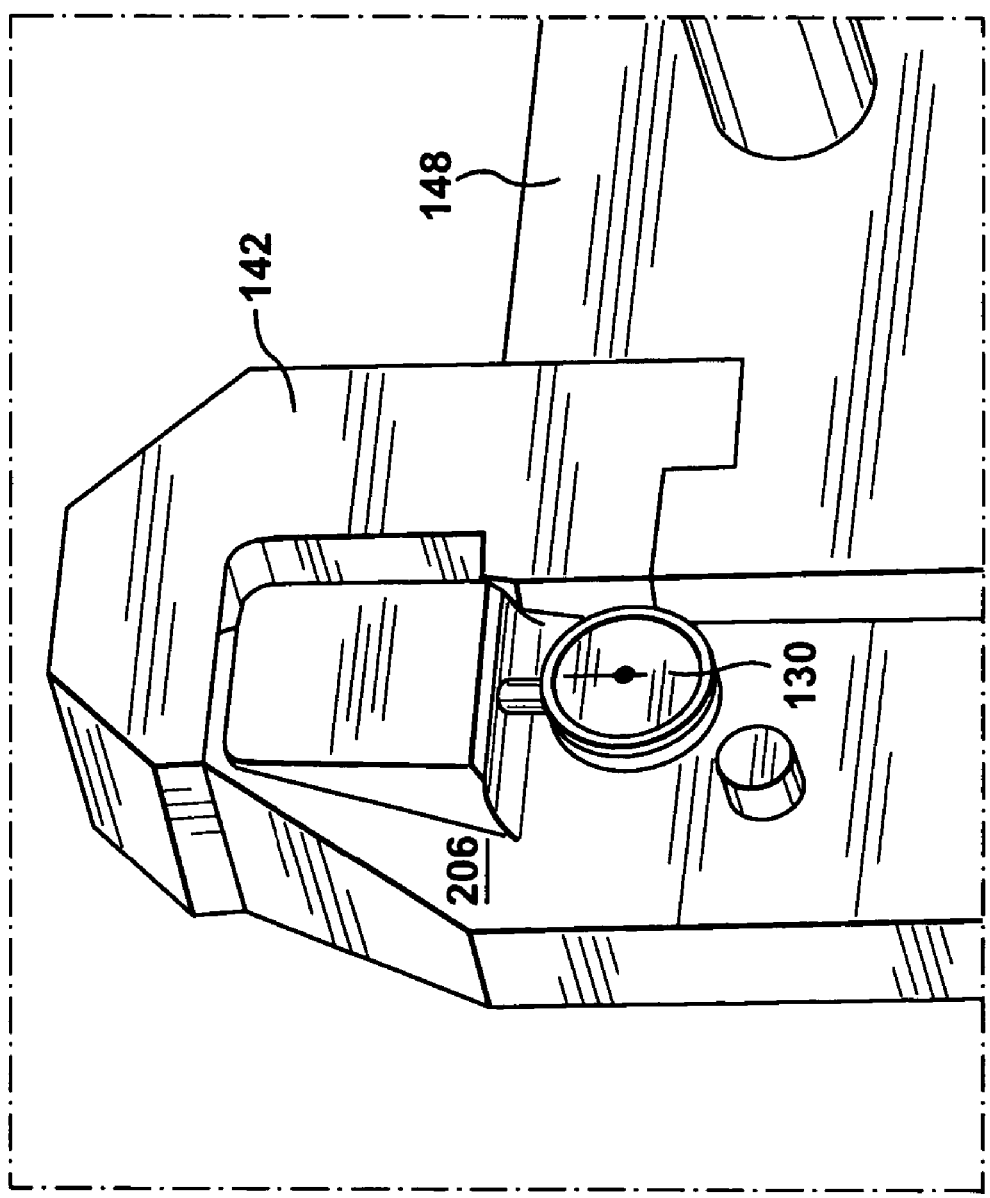
FIG. 22 is a perspective view of a dial indicator device for indicating proper positioning of the core plate.
Figure 23:
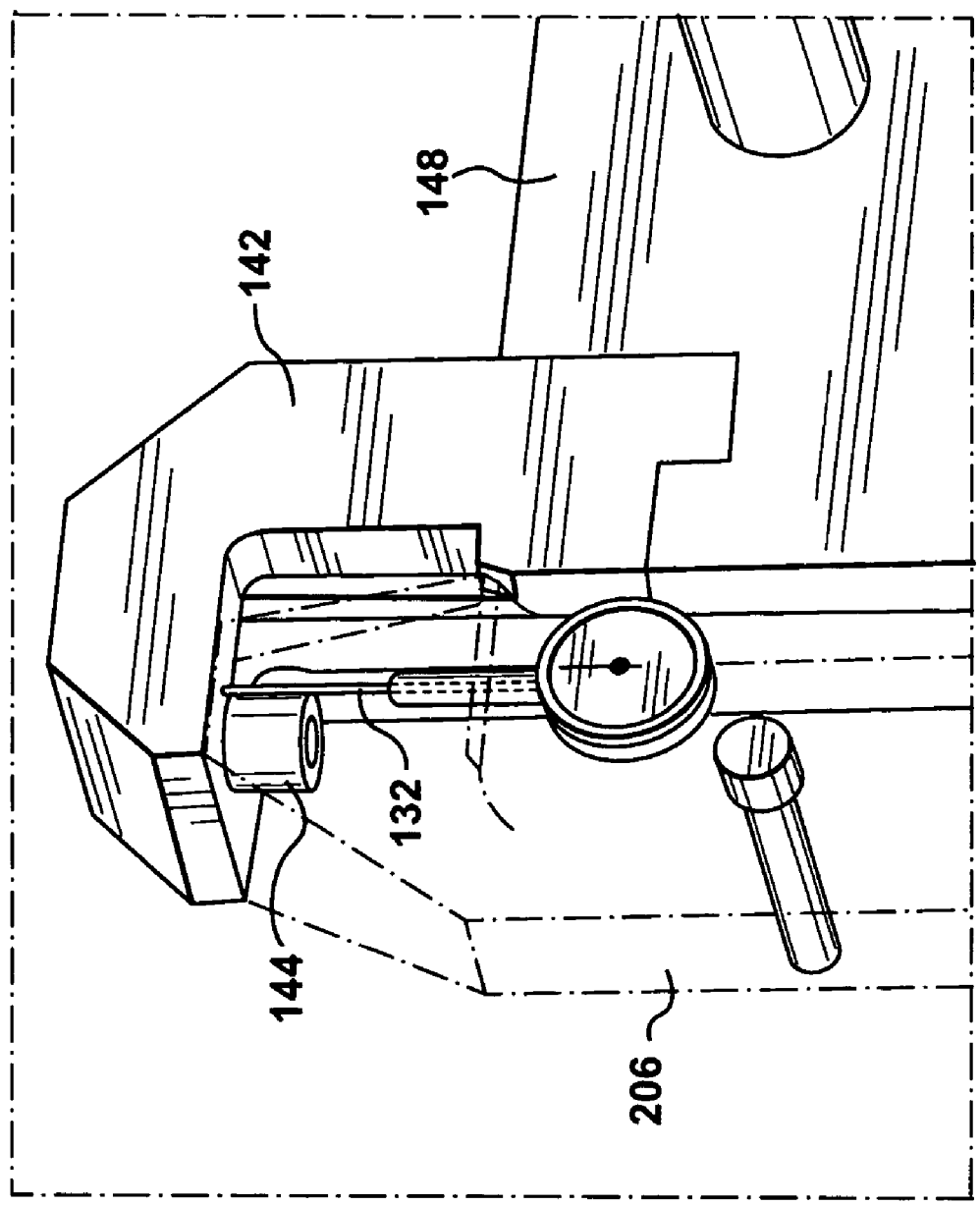
FIG. 23 is a partially cut-away view of a guide with the dial indicator.

Another feature of the machine is the provision of a dial indicator 130 shown in FIGS. 22 and 23. Compression of the extended rod 132 by the downward movement of the core plate separation blocks 140 and 142 indicate directly whether the blocks 140 and 142 and the core plate 148 to which they are attached have been properly secured in the machine. The dial indicators 130 are situated under an overhang of the guide plate 206 so that they are protected from incidental contact. The use of two indicators provides an operator with the choice of standing on either side of the machine while the core plates are being installed. In operation, the dial indicators would be set during the initial or first installation of a moldset in the machine. This setting would be used to measure the proper insertion of subsequent moldsets.

Figure 24:
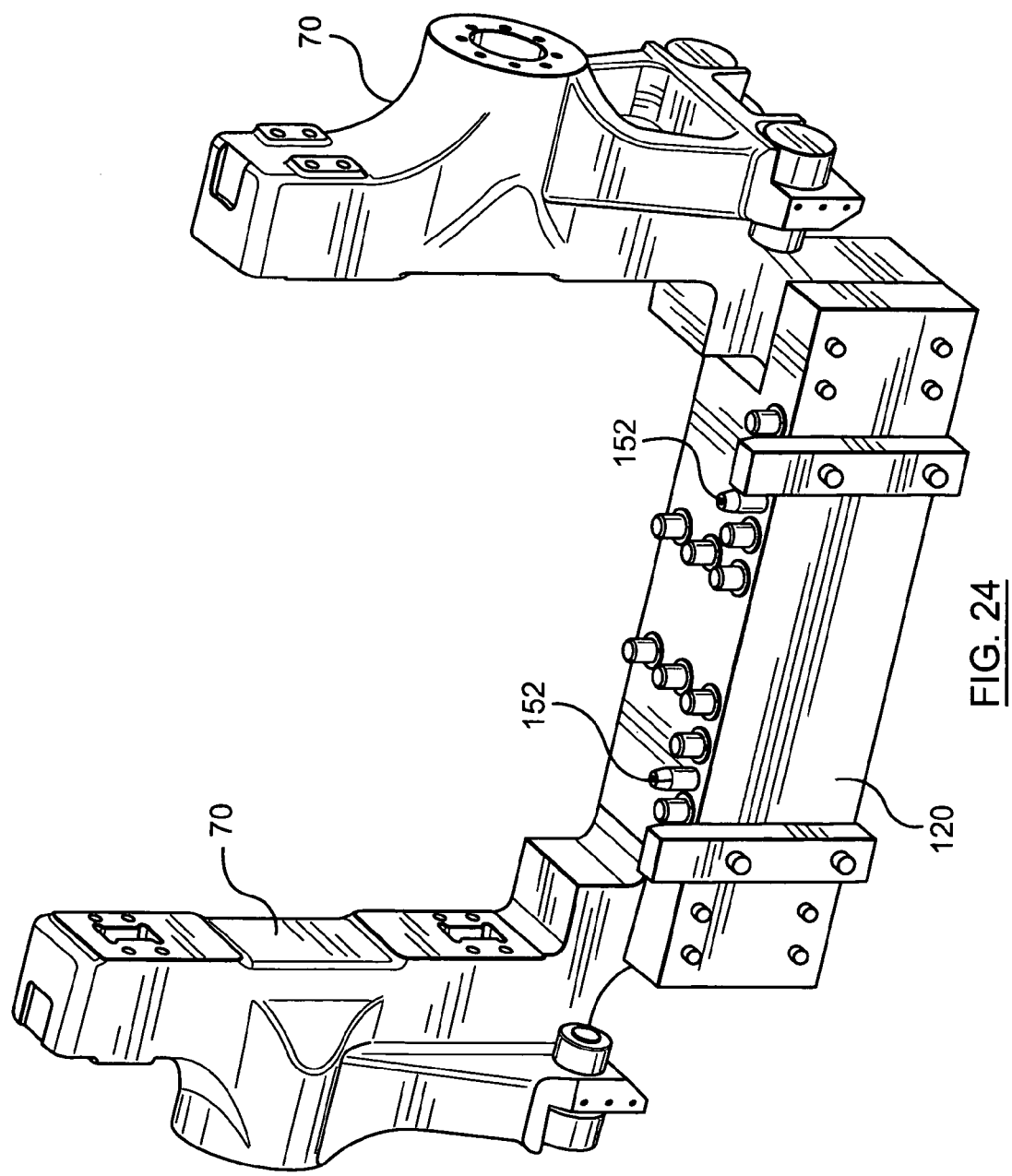
FIG. 24 is a perspective view of the water manifold mounted on a carrier.
Figure 25:
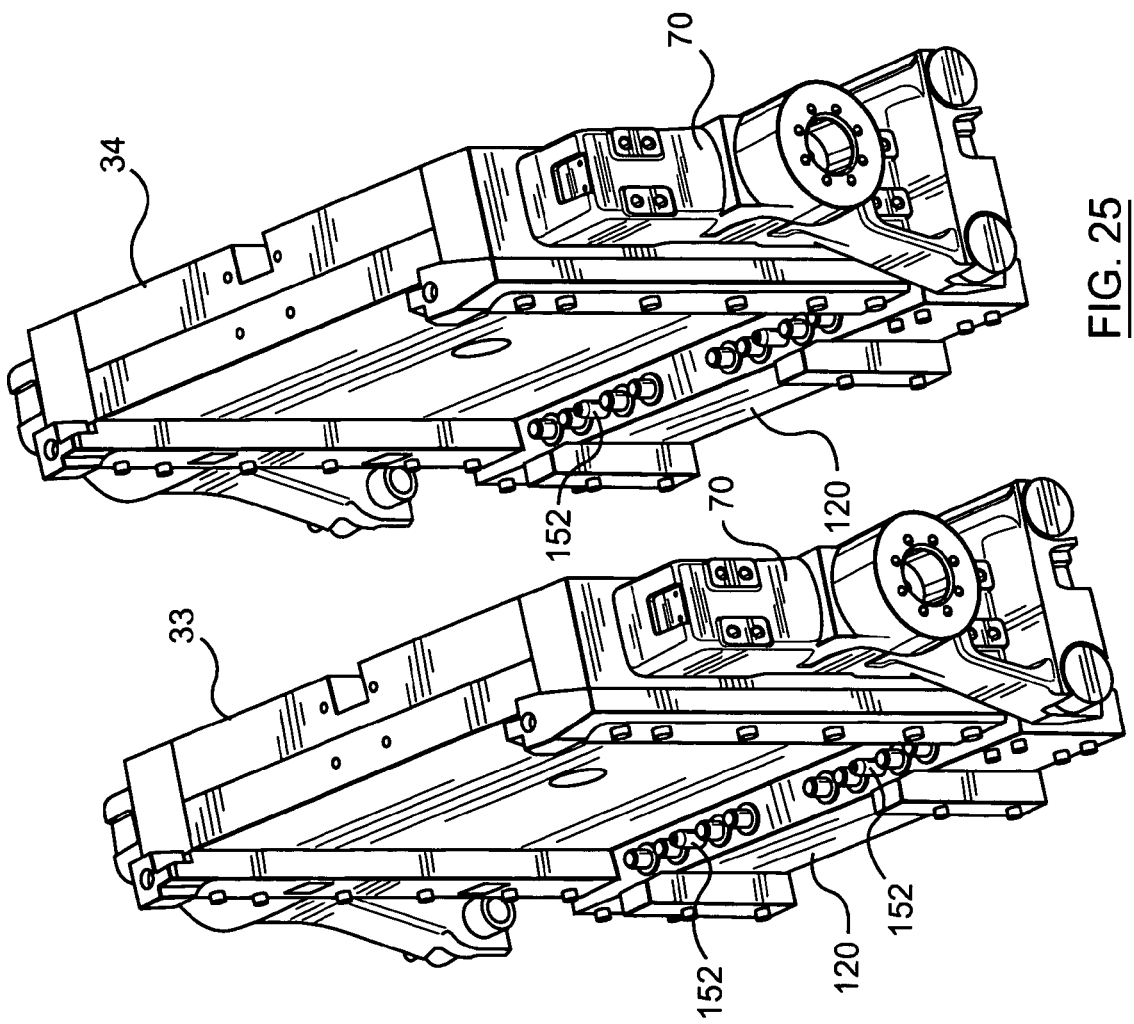
FIG. 25 is a perspective view of the two carrier assemblies with manifolds and hot runners.

As shown in FIGS. 24 and 25, the water manifolds 120 are bolted to the carriers 70 and provide nipple connections 118 to the hot runners 33 and 34 and the core plates (not shown). When the hot runners and core and cavity plates are guided onto the carriers 70, the nipple connectors 118 automatically engage corresponding openings in the hot runners and core and cavity plates. The guide pins 152 on the top of the water manifold 120 serve to guide a core plate 48 or 148 onto the manifold 120 and ensure that the tapered female connectors 121 on a core plate 48 or 148 are aligned with the nipples 118 along the front edge of the manifold 120.

It will, of course, be understood that the above description has been given by way of example only and that modifications in detail may be made within the scope of the present invention.

What is claimed is:

1. A method of loading a moldset into an injection molding machine, said moldset including a core plate and a cavity plate, comprising the steps of:
   latching a cavity plate to a core plate using a removable latch;
   guiding said core plate along a guide plate, said guide plate including (a) a tapered surface for receiving and guiding the core plate onto a receiving slot and (b) a slightly raised surface for preventing the core plate from scuffing the face; the guide plate being configured to guide the core plate (i) into an open mold, (ii) along a face in said mold, (iii) while maintaining separation between said face and said core plate and maintaining said cavity plate spaced from hot runner nozzles in a hot runner in said mold;

closing said mold to engage said cavity plate with said hot runner nozzles;

securing said cavity plate to said hot runner;

removing said latch between said cavity plate and said core plate; and opening said mold.

2. A method as defined in claim 1 including the further step of bolting said cavity plate to said hot runner.

3. A method as defined in claim 1 or claim 2 wherein said face is a face of a movable platen.

4. A method as defined in claim 1 or claim 2 wherein said face is a back surface of a hot runner.

5. A method of loading as defined in claim 1 or 2 wherein said machine is a three level stack mold machine and all core plates are orientated in a uniform direction.

6. A method of loading as defined in claim 1 or claim 2 wherein said core plate docks in separated water and air connections when fully guided into said mold.

7. A method of loading as defined in claim 1 or claim 2 wherein said core plate simultaneously docks in separated water and air connections when fully guided into said mold, said air connections being located near a top surface of said mold and said water connections being located near a bottom of said mold.

8. A method of loading as defined in claim 1, wherein said guiding is executed until a dial indicator indicates that said moldset is properly seated.

* * * * *